(12) United States Patent
Yoon

(10) Patent No.: US 7,710,944 B1
(45) Date of Patent: May 4, 2010

(54) METHOD AND APPARATUS FOR TIME-OF-DAY SYNCHRONIZATION BETWEEN NETWORK NODES

(75) Inventor: Chang-June Yoon, Edison, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 363 days.

(21) Appl. No.: 11/521,413

(22) Filed: Sep. 15, 2006

(51) Int. Cl.
*H04J 3/06* (2006.01)

(52) U.S. Cl. .................. 370/350; 370/503; 370/324; 455/502

(58) Field of Classification Search .................. 370/324, 370/350
See application file for complete search history.

(56) References Cited

U.S. PATENT DOCUMENTS

| H967 H | 9/1991 | Mariotti |
|---|---|---|
| 5,363,375 A | 11/1994 | Chuang et al. |
| 6,665,316 B1 | 12/2003 | Eidson |
| 6,847,307 B2 | 1/2005 | Thao et al. |
| 6,983,160 B2 | 1/2006 | Drawert |
| 7,304,981 B2 | 12/2007 | Yoon et al. |
| 2001/0039192 A1 | 11/2001 | Osterling et al. |
| 2002/0018402 A1 | 2/2002 | Egle et al. |
| 2002/0054611 A1 | 5/2002 | Seta |
| 2002/0186716 A1 | 12/2002 | Eidson |
| 2003/0048811 A1 | 3/2003 | Robie, Jr. et al. |
| 2003/0083103 A1 | 5/2003 | Drawert |
| 2003/0109264 A1 | 6/2003 | Syrjarinne et al. |
| 2004/0047307 A1 | 3/2004 | Yoon et al. |
| 2004/0054809 A1 | 3/2004 | Goff |
| 2004/0123174 A1 | 6/2004 | Dhupar et al. |
| 2004/0137916 A1 | 7/2004 | Syrjarinne et al. |
| 2004/0174296 A1 | 9/2004 | Farmer |
| 2004/0198394 A1 | 10/2004 | Syrjarinne et al. |
| 2004/0203951 A1 | 10/2004 | Mazzara, Jr. et al. |
| 2005/0146462 A1 | 7/2005 | Abraham et al. |
| 2005/0147196 A1 | 7/2005 | Quilter et al. |
| 2005/0212702 A1 | 9/2005 | Brabec et al. |

FOREIGN PATENT DOCUMENTS

EP 0991216 A2 4/2000

OTHER PUBLICATIONS

Specification of the Bluetooth System, Version 1.1, Feb. 22, 2001.
IEEE Standard for Wireless LAN-Medium Access Control and Physical Layer Specification, P802.11, 1999 Edition.
"Baseband Specification," Bluetooth, Version 1.1, Feb. 22, 2001, pp. 84-91.
"Wireless LAN Medium Access Control (MAC) and Physical Layer (PHY) Specifications," IEEE, 1999, pp. 9-20.

*Primary Examiner*—Patrick N Edouard
*Assistant Examiner*—Jalaleddin Amirmokri
(74) *Attorney, Agent, or Firm*—Edell, Shapiro & Finnan, LLC

(57) ABSTRACT

A node with local GPS time in an ad-hoc wireless network synchronizes with the network time immediately and slowly pulls the network time to GPS time. However, network nodes may immediately transition to the common GPS time after an island or group head node determines that the transition in network time does not disturb the communication links.

28 Claims, 23 Drawing Sheets

METHOD AND APPARATUS FOR TIME-OF-DAY SYNCHRONIZATION BETWEEN NETWORK NODES

GOVERNMENT LICENSE RIGHTS

The U.S. Government may have a paid-up license in this invention and the right in limited circumstances to require the patent owner to license others on reasonable terms as provided for by the terms of contract DARPA SUO Program MDA972-99-9-0007.

BACKGROUND OF THE INVENTION

1. Technical Field

The present invention pertains to synchronization of nodes within a network. In particular, the present invention pertains to a time-of-day synchronization (TOD) within wireless ad-hoc networks that determines an appropriate time for network nodes to switch to a common GPS time without disruption of existing communication links.

2. Discussion of Related Art

Commercial wireless devices employ clock synchronization techniques for their operation in WPAN (Wireless Personal Area Networks) and WLAN (Wireless Local Area Networks) type networks. Exemplary WPAN type devices include Bluetooth devices designed to support low bandwidth and short distance (e.g., less than ten meters) wireless connections. Bluetooth specifies the protocols to be used by different handheld computing devices in order to communicate and exchange data. For timing purposes, Bluetooth specifies a master/slave clock synchronization mechanism allowing synchronization between neighboring nodes that reside one-hop away from each other within the network.

The IEEE 802.11 WLAN standard specifies two different approaches for time synchronization. One approach accommodates infrastructure-based networks, while the other approach accommodates independent networks. With respect to infrastructure-based networks, IEEE 802.11 provides a master/slave clock synchronization mechanism, where a special fixed node (referred to as an access point (AP)) is used as a master. In an independent network, a mobile node transmits a beacon message at a selected beacon period. Each node receiving the beacon message updates the node clock with the value in the received beacon message in response to the received value being greater than the node current local time. If the received value is less than the node local time, the received value is discarded.

In a tactical environment, Radio Frequency (RF) communications must be protected against major enemy threats including jamming and signal interception. In order to protect against these threats, a modern tactical system constantly changes the transmission frequency (e.g., by frequency hopping (FH), by direct sequence spread spectrum (DSSS), by both techniques, etc.) and encrypts the transmitted data with a time dependent encryption algorithm. Tactical network nodes must therefore be accurately synchronized in time to communicate. The time synchronization problem is especially difficult in a tactical network due to the volatility of RF links.

An example of a tactical ad-hoc radio system employing a conventional approach to time-of-day (TOD) synchronization includes a Near Term Data Radio (NTDR) system from ITT. This system employs three time-of-day (TOD) message types (e.g., Cold Start, Late Net Entry (LNE) and In-Net) to enable all radios or nodes within the network to synchronize with a common time (e.g., time-of-day). In Cold Start (CS) mode, all radios or nodes within the network use a fixed time (Transmission Security (TRANSEC)). This enables all radios within the network to listen to the Cold Start messages without an initial time (e.g., time-of-day) reference. Upon receiving a Cold Start time-of-day update message, a radio extracts the transmitter time from the message and uses that time to update the node time-of-day. Subsequently, the radio in Cold Start mode enters a Late Net Entry (LNE) mode and selects an LNE time (TRANSEC), which is generally within six minutes from an In-Net time-of-day. A radio dwelling in LNE mode remains in that mode until the radio time-of-day is within twenty milliseconds (20 msec) of the transmitter time. Once this occurs, the radio transitions into an In-Net mode. An In-Net mode message is used for normal message transmission within the network.

The time-of-day synchronization scheme of the Near Term Data Radio (NTDR) system has been modified to satisfy the constrained requirements of a Small Unit Operation (SUO) network. This type of network includes extremely mobile, volatile, power and bandwidth limited operational conditions. The basic functionality of the Cold Start (CS), Late Net Entry (LNE) and In-Net modes of the Near Term Data Radio (NTDR) system are similar to "Isolated", "In Sync", and "Associated" modes employed in the SUO system. Due to the severe timing constraints imposed by the Small Unit Operation (SUO) security features, nodes must establish a common network time before commencing communications. This is accomplished by the time-of-day (TOD) synchronization scheme or protocol. If a node with local Global Positioning System (GPS) time or capability is present, the aggregate network time (e.g., "net time" or non-GPS based network time) must be slowly pulled towards the GPS time in order to facilitate multi-tier operation. However, the time-of-day synchronized nodes constantly lose and regain connectivity with each other in a tactical or ad-hoc environment. In order to solve the problem of fragmented networks, a "flywheel" technique has been proposed to allow nodes to continue to predict, and therefore track, the movement of the network time as adjusted by neighboring nodes. This type of technique or scheme is disclosed in U.S. Patent Application Publication No. 2004/0047307 (Yoon et al.), the disclosure of which is incorporated herein by reference in its entirety. One of the advantages of the flywheel time-of-day synchronization scheme includes a roaming node with local GPS time being able to synchronize with existing (non-GPS based) network time immediately, and slowly pull the network time toward the GPS based time.

Although the flywheel technique overcomes difficulties encountered with respect to time synchronization within an ad-hoc environment, the technique can stand some improvement. For example, when the network time (e.g., non-GPS based time) differs from the GPS time by one-second, the interval for the network time to reach the GPS based time is in excess of one hour (e.g., 1.33 hours). The time-offset between the network time and the GPS time is unpredictable and depends upon the operational scenario (e.g., the node starting first and/or the node having a local GPS time among the neighboring nodes, the start time of the node, etc.). This potentially long pulling time by the flywheel technique may be unacceptable in the highly mobile, volatile, power and bandwidth limited tactical networks. In an attempt to overcome this problem, a node with local GPS time may flood an LNE message to neighboring nodes directing the nodes to acquire the GPS signal and set node clocks to GPS time immediately. However, the sudden changes of network time may disturb the current communication in the existing network since nodes more than one hop away from a group or island head node may not timely receive information related to the GPS transition and be unaware of when to perform that transition to GPS time.

Further, if a node local clock time is not updated by neighboring nodes with GPS time, drifts in the local clock may accumulate during the long pulling period of the flywheel technique. The accumulated clock drifts during the flywheel pulling interval may cause fragmented networks. For example, a node with a clock drift rate of one part per million (ppm) that updates the node clock via the flywheel technique loses connectivity with the existing network after two-hundred updates since the maximum value for staying within the network time is exceeded (e.g., $\Delta t_{max}$ of two-hundred microseconds (200 μsec)).

When two unconnected islands or groups of nodes (e.g., fragmented networks) come within proximity of one another, some of the member nodes within the different islands begin to establish RF neighbor relationships in order to merge. Unless time synchronization is achieved between these neighboring nodes, the merging of the fragmented networks cannot be resolved.

The time synchronization between fragmented networks is very expensive with respect to the hardware/software processing required. For example, an Associated node within the SUO system requires an extra receiver during the pulling period of the flywheel technique in order to monitor reception of an LNE message for resolving fragmented networks for merging. Even if the node receives the LNE message, additional processing or techniques are needed to arrange other nodes and set the node times to the targeted time without interrupting the communication links.

Thus, pulling network time to GPS time by a node with GPS may be problematic in tactical ad-hoc networks due to a potentially long pulling time, accumulated clock drifts and very expensive hardware/software implementation for a merge.

OBJECTS AND SUMMARY OF THE INVENTION

Accordingly, it is an object of the present invention to rapidly transition network nodes to GPS time within an ad-hoc wireless network.

It is another object of the present invention to determine an appropriate time for network nodes to transition to GPS time without affecting communication links within the network.

The aforesaid objects may be achieved individually and/or in combination, and it is not intended that the present invention be construed as requiring two or more of the objects to be combined unless expressly required by the claims attached hereto.

According to the present invention, a node with local GPS time in an ad-hoc wireless network synchronizes with the network time immediately and slowly pulls the network time to GPS time. Nodes within the network transition to the common GPS time after an island or group head node determines that the transition in network time does not disturb the communication links. In particular, an island or group head node determines a score value based on the quantity of members in an island and the offset between network time and GPS time. If the score exceeds a threshold value, the island head node sends a transition request message to corresponding member nodes of the island. The head node further starts a timer.

When a member node receives the transition request message, the node sends an acknowledgement (ACK) message back to the island head node. Once the island head node receives acknowledgement messages from more than a predefined percentage of known island members within the timer interval, the island head node determines the proper time to transition to GPS time and sends a confirmation message to corresponding member nodes.

When island member nodes receive the confirmation messages, the node local network time may be updated to GPS time in response to proper conditions. If acknowledgement messages are received from less than a predefined percentage of member nodes, the island head node retransmits a transition request message and repeats the negotiation for a predefined number of trials (e.g., typically three times). When the negotiation is not successful and the pulling interval is still large, the island head node delays by a random back-off interval and restarts the process again. In the case where some nodes do not transition to the GPS time, these nodes become Isolated and attempt to synchronize with the existing networks. The present invention technique may control degradation of the existing communication links based on the predefined value of the response percentage.

Once the network time transitions to the common GPS time, the problem of network time merge is resolved since the ultimate goal of the time-of-day synchronization is to have all network times be based upon the common GPS time. If the network time cannot transition to the GPS time (for any reason), the clock drift rate must be estimated and compensated when the local clock is updated without hearing from neighboring nodes with the GPS based time. Although the clock drift rate does not change significantly, the rate may cause fragmentation when a node cannot hear from neighboring nodes with GPS based time for several minutes.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

DETAILED DESCRIPTION OF THE PREFERRED EMBODIMENTS

Initially, network nodes must typically establish a common network time before communications can commence due to severe timing constraints imposed by the particular network. This is accomplished by a time-of-day (TOD) synchronization protocol. If a network node with local Global Positioning System (GPS) time is present, the aggregate network time ("net time" or non-GPS based time) must be slowly pulled towards the GPS time in order to facilitate multi-tier operation.

In particular, a conventional time-of-day synchronization protocol for a Small Unit Operation (SUO) type network includes an Isolated node devoting resources to discovering and synchronizing time with RF neighboring nodes. The Isolated node issues Late Net Entry (LNE) signals at a high rate and periodically monitors an LNE channel for LNE messages from other network nodes. LNE signals are transmitted on the highest frequency channel available to the radio. The LNE signal uses a fixed code division multiple access (CDMA) spreading code and a fixed transmission security (TRANSEC) from the current key fill.

An Associated node issues LNE signals at a low rate. Since all Associated nodes issue LNE messages independently, an Isolated node quickly detects an LNE signal despite transmission of those messages at a low rate. Once an LNE message is detected, the Isolated node synchronizes with the Associated nodes. After a node completes the time-of-day synchronization, Packet Radio Organizational Packets (PROP) messages are transmitted to identify other RF neighboring nodes for establishing bi-directional communications. These messages are basically used to discover new RF neighboring nodes and exchange information for automatic transmission power (ATP) calculations.

Figure 1A:
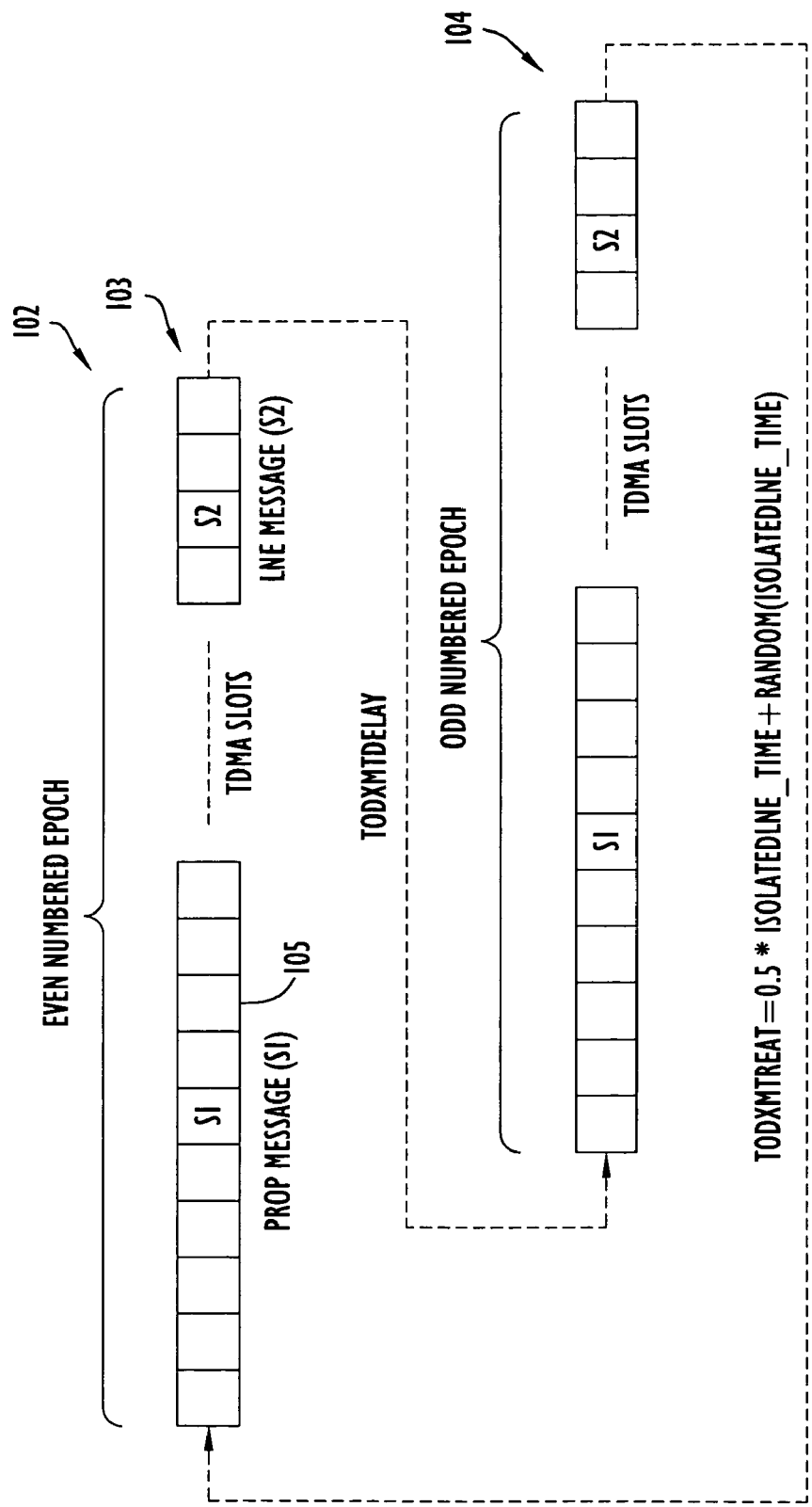
FIG. 1A is a diagrammatic illustration of an exemplary time-of-day synchronization waveform transmitted by a network node in an Isolated state in order to join the network.
Figure 1B:
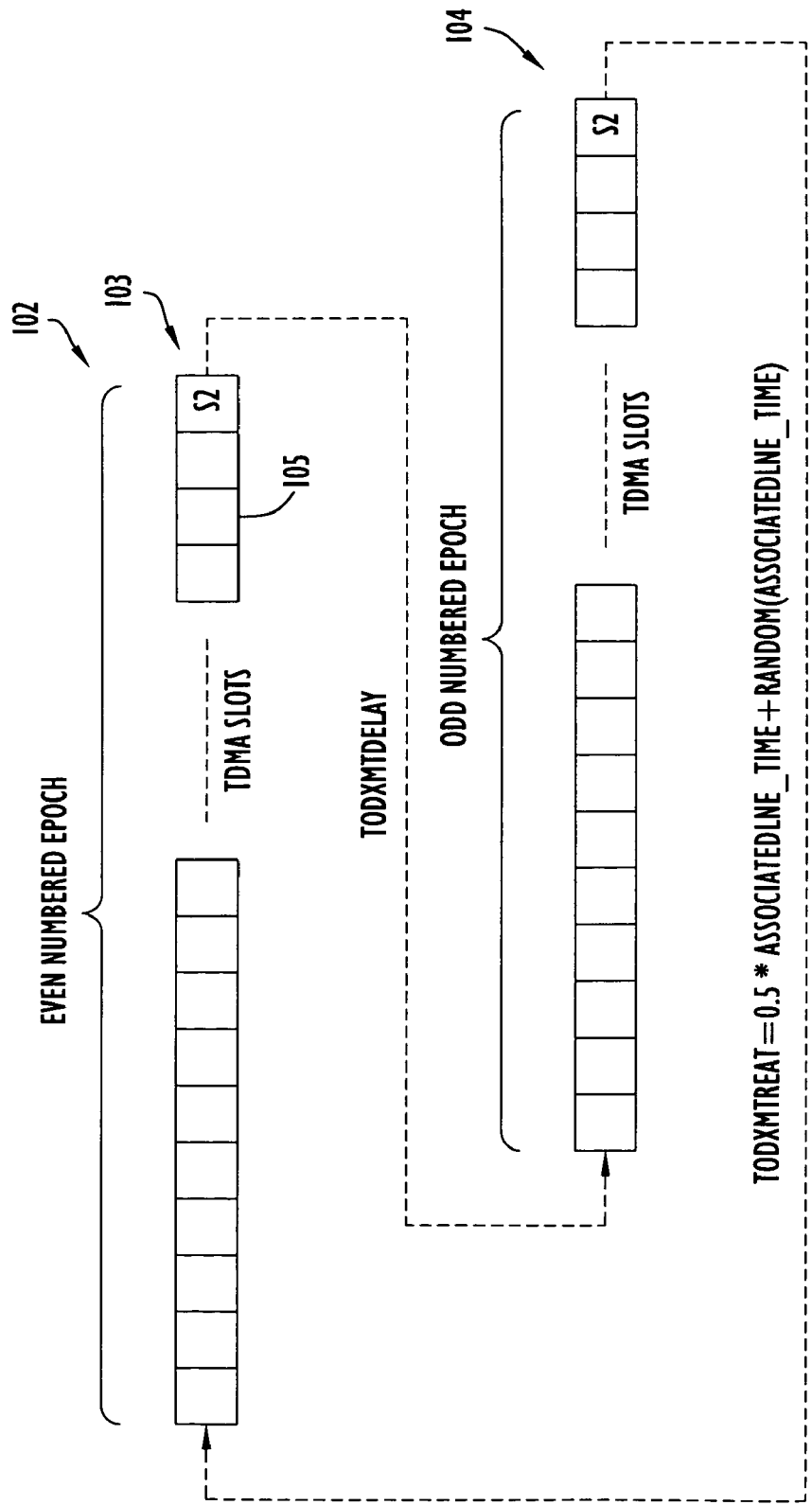
FIG. 1B is a diagrammatic illustration of an exemplary time-of-day synchronization waveform transmitted by a network node in an Associated state after joining the network.

Time-of-day message transmission waveforms are illustrated, by way of example only, in FIGS. 1A-1B. Specifically, a synchronization waveform 102 includes a plurality of epochs, each including a series of Time Division Multiple Access (TDMA) time slots 105. The time slots contain desired information for transmission and/or reception. The epochs are continuously transmitted and referenced herein as even epoch 103 and odd epoch 104. An odd epoch 103 is transmitted after a predetermined delay (e.g., TODXmtDelay as viewed in FIGS. 1A-1B) from the transmission of an even epoch 102. Similarly, an even epoch 102 is transmitted after a predetermined delay (e.g., TODXmtReat as viewed in FIGS. 1A-1B) from the transmission of an odd epoch 103. Thus, the even and odd epochs are continuously transmitted in an interleaved fashion.

An Isolated network node attempts to discover neighbors by listening for LNE and RTS (request-to-send) transmissions from neighboring nodes. During Isolated status, PROP messages (e.g., S1 as viewed in FIG. 1A) and LNE messages (e.g., S2 as viewed in FIGS. 1A-1B) are selected randomly in order to minimize the possibility of other nodes being able to intercept local node transmissions and to avoid collision. An exemplary synchronization waveform for an Isolated node transmitting PROP and LNE messages is illustrated in FIG. 1A.

Since the RTS and LNE signals use different spreading codes and frequencies, the Isolated node transceiver is typically assigned to listen for one of these signals, while an auxiliary receiver listens for the other. However, in a battery powered or portable system, the use of two receiving devices consumes significant power. Typically, the auxiliary receiver in an Isolated node is placed into a standby mode to conserve power, while the transceiver alternately switches between the frequencies and codes used for LNE and RTS messages. Since the transmitting node sends an LNE and an RTS message in both even and odd epochs, the transceiver detects the new RF neighboring node (e.g., even if the epoch counters of the two nodes are out of phase with each other).

The neighbor discovery process continues until the Isolated node becomes Associated with its RF neighboring nodes. In this case, the newly Associated node transmits the LNE message (without the PROP message) in even and odd epochs 103, 104 (e.g., message S2) as illustrated in FIG. 1B.

The conventional time-of-day synchronization described above leads to a fragmented communications network, where one group of network nodes may be synchronized to one time-of-day while another group of network nodes may be synchronized to a different time-of-day. Further, synchronized nodes are constantly losing and regaining connectivity within a tactical or ad-hoc wireless environment. In order to accommodate these conditions, the flywheel technique described above enables nodes to continue to predict, and therefore track, the movement of the network time as adjusted by neighboring nodes. However, the flywheel technique may need a long pulling period to transition network nodes to GPS time. This may be undesirable for the tactical or ad-hoc wireless environment. Accordingly, the present invention time-of-day synchronization provides network nodes with rapid transition to GPS time in the tactical or ad-hoc wireless environment.

Figures 2A, 2B:
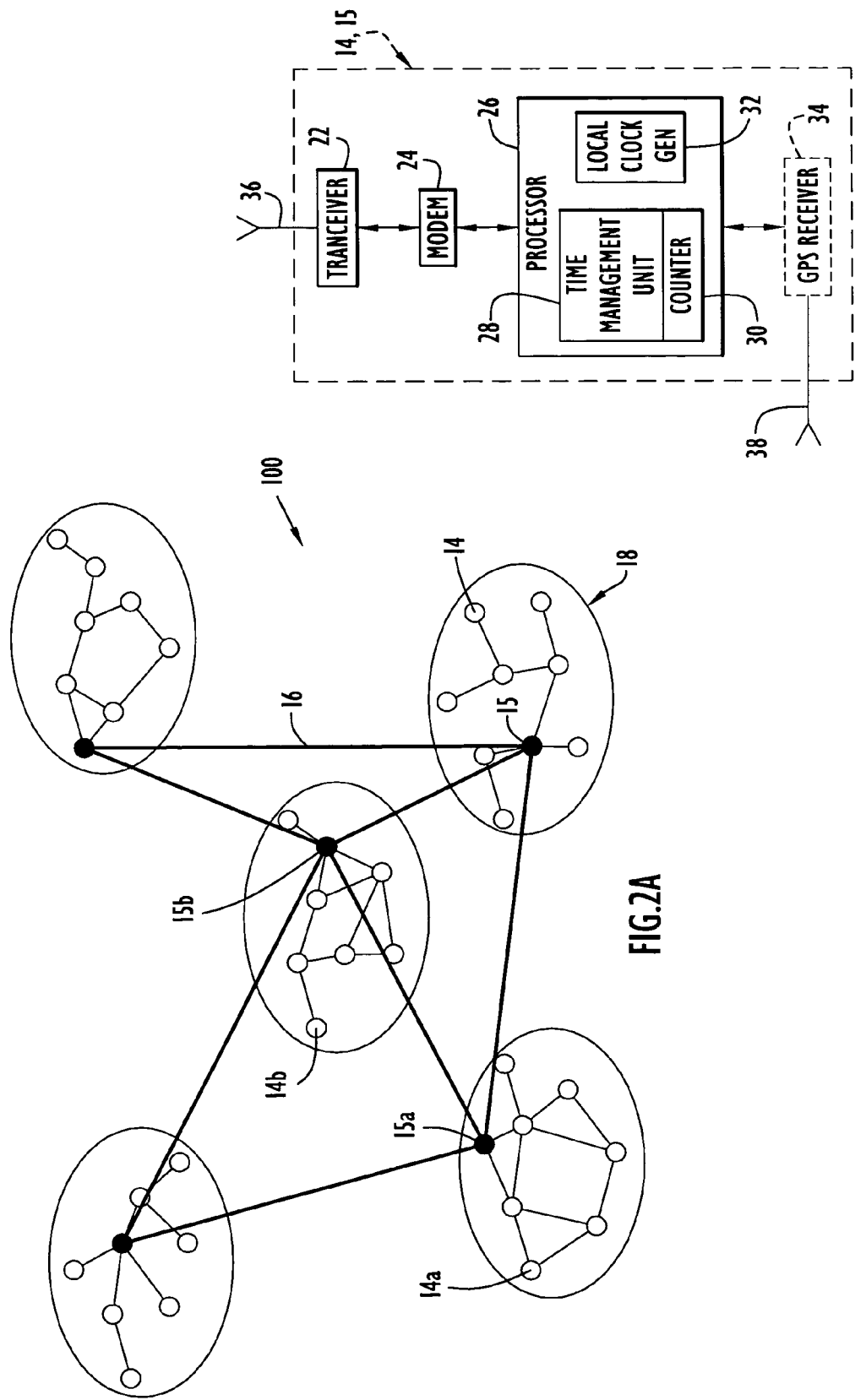
FIG. 2A is a diagrammatic illustration of network nodes according to the present invention arranged in an exemplary communication network.
FIG. 2B is a block diagram of a network node of FIG. 2A.

An exemplary network architecture that may be employed by the present invention is a multi-hop wireless ad-hoc network. This type of network does not include an infrastructure (e.g., there is no base station as in a cellular network, where a single-hop environment of a cellular network becomes a special case) and may be utilized in a hostile network environment (e.g., a tactical battlefield, etc.) with unfriendly jamming. An exemplary SUO type wireless ad-hoc network including network nodes according to the present invention is illustrated in FIG. 2A. Specifically, a wireless network 100 includes a plurality of nodes 14 arranged in islands 18. Each island is in the form of a flat multi-hop network and includes corresponding island member nodes 14 with one of those member nodes designated as an island head node 15. These island arrangements form a first tier of network 100 and facilitate communication within an island between the island head and member nodes and between the member nodes themselves. The head nodes of each island are in communication with each other and form a backbone network 16. The backbone network essentially forms a second tier of network 100 and facilitates communications between nodes of different islands (e.g., generally providing communications over greater distances). For example, a node 14A from a first island desires to transmit a message to node 14B of a second island. Node 14A transmits the message to a corresponding head node 15A of the first island that utilizes the second tier of network 100 to forward the message to a head node 15B of the second island. Head node 15B subsequently forwards the received message to destination node 14B. Alternatively, nodes 14 may be arranged to form a network including a single or any quantity of tiers.

A network node 14 according to the present invention is illustrated in FIG. 2B. Specifically, node 14 includes a transceiver or receive/transmit unit 22, a modem 24, a processor 26 and an optional GPS receiver 34. The processor is preferably implemented by a conventional microprocessor or controller and controls the node for transmission and reception of messages and time-of-day synchronization in accordance with the present invention as described below. Transceiver 22 is preferably implemented by a conventional transceiver (e.g., transmitter and receiver) that transmits and receives messages, preferably in the form of radio frequency (RF) signals, in accordance with processor instructions. The transceiver is coupled to an antenna 36 to transfer signals with the surrounding environment. Modem 24 is preferably implemented by a conventional modem and transfers signals between the transceiver and processor.

GPS receiver 34 may be implemented by any conventional or other GPS or satellite receiver and obtains GPS time from GPS satellites via a GPS antenna 38. The GPS receiver may alternatively be a separate unit and coupled to node 14. The GPS receiver typically resides within a single network node to provide GPS time for the network; however, any quantity of nodes may include the GPS receiver and provide the GPS time.

Processor 26 includes a time management unit 28 and a local clock generator 32. These units may be implemented by individual, or any combination of, software and/or hardware (e.g., circuitry, logic, processors, etc.) modules or units. The local clock generator generates a reference time that may be adjusted or updated by time management unit 28 to produce a node local time-of-day. The local time-of-day may be sent to transceiver 22 via modem 24 and transmitted onto the network through antenna 36. Conversely, transceiver 22 may receive messages from neighboring nodes via antenna 36. The received messages may include a time-of-day of a neighboring node and other information as described below. The received messages are provided to time management unit 28 via modem 24.

Time management unit 28 utilizes the GPS-based time from GPS receiver 34, the local time-of-day from clock generator 32 and the time-of-day received from a neighboring node to update or adjust the node local time-of-day in accordance with the present invention time-of-day synchronization as described below. The time management unit may include a counter 30 to determine an integer value corresponding to a quantity of update values for synchronization of the node time-of-day to the GPS-based time as described below. The counter may store an integer count value that may be set to a specific value or adjusted (e.g., incremented or decremented by any value). The processor may further include a memory unit (not shown) to store the integer count value and other parameters. A head node 15 is substantially similar to node 14 described above.

Initially, the link layer of the communications protocol within network nodes sends and receives Packet Radio Organizational Packets (PROP) messages to discover and learn basic facts about neighboring nodes. This information is used to begin formation of a network. A node neighbor table includes various information (e.g., island size, island ID, partition ID, Community of Interest (COI), Distance to Island Head, Remaining battery power, Node type, GPS status, GPS relays, Remaining Pulling Interval to GPS time, flywheel status, time offset to GPS time, etc.) that is utilized by an island head node to determine the appropriate time to cease pulling of the network time and immediately transition to GPS time without significantly disturbing the communication links of the existing network.

The island manager or head node for network formation is responsible for controlling the time-of-day synchronization operation and utilizes commands sent via the link layer of the node communications protocol. When a new command (e.g., a Begin_TOD_Sync( ) command) is received on a network tier, a new synchronization procedure is initialized on the tier indicated within the received command. Once the time-of-day synchronization is completed in the network, the network formation process commences and is based on neighboring node data obtained by the link layer initiating the neighbor discovery process (e.g., transmission of PROP messages). In particular, once time-of-day synchronization has been performed, network nodes begin to exchange PROP messages to discover new RF neighboring nodes for establishing bi-directional communication. The PROP messages are broadcast packets for local node information change, periodic discovery and inquiry. The PROP messages include node status information (e.g., island size, island ID, partition ID, Community of Interest (COI), Distance to Island Head, Remaining battery power, Node type, GPS status, GPS relays, Remaining Pulling Interval to GPS time, flywheel status, time offset to GPS time, etc.) as described above. The island head node may determine the proper time for the transition to GPS time to enable all network nodes or members (if possible) to reach common GPS time.

Different time-of-day synchronization modes may be available for an operator to select for satisfying specific operational requirements. The modes include a flywheel mode, a flywheel/jump mode and a manual mode. The flywheel mode is described in the aforementioned published patent application, while the flywheel/jump mode corresponds to the time-of-day synchronization of the present invention described below. Manual mode disables automatic time-of-day synchronization updates.

Figure 3A:
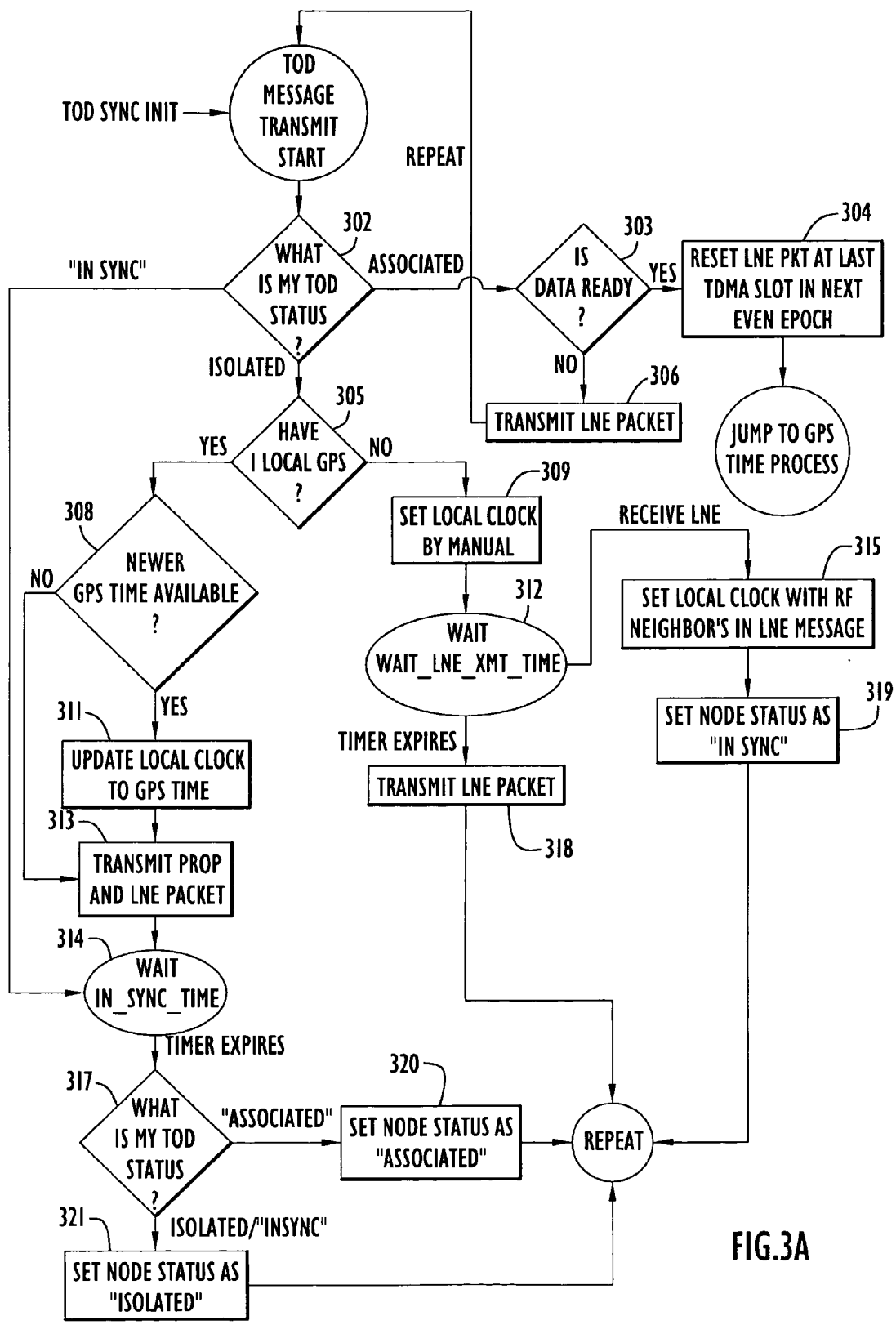
FIGS. 3A-3B are a procedural flow chart illustrating the manner in which time-of-day synchronization messages are transmitted by a network node in accordance with the time-of-day synchronization of the present invention.
Figure 3B:
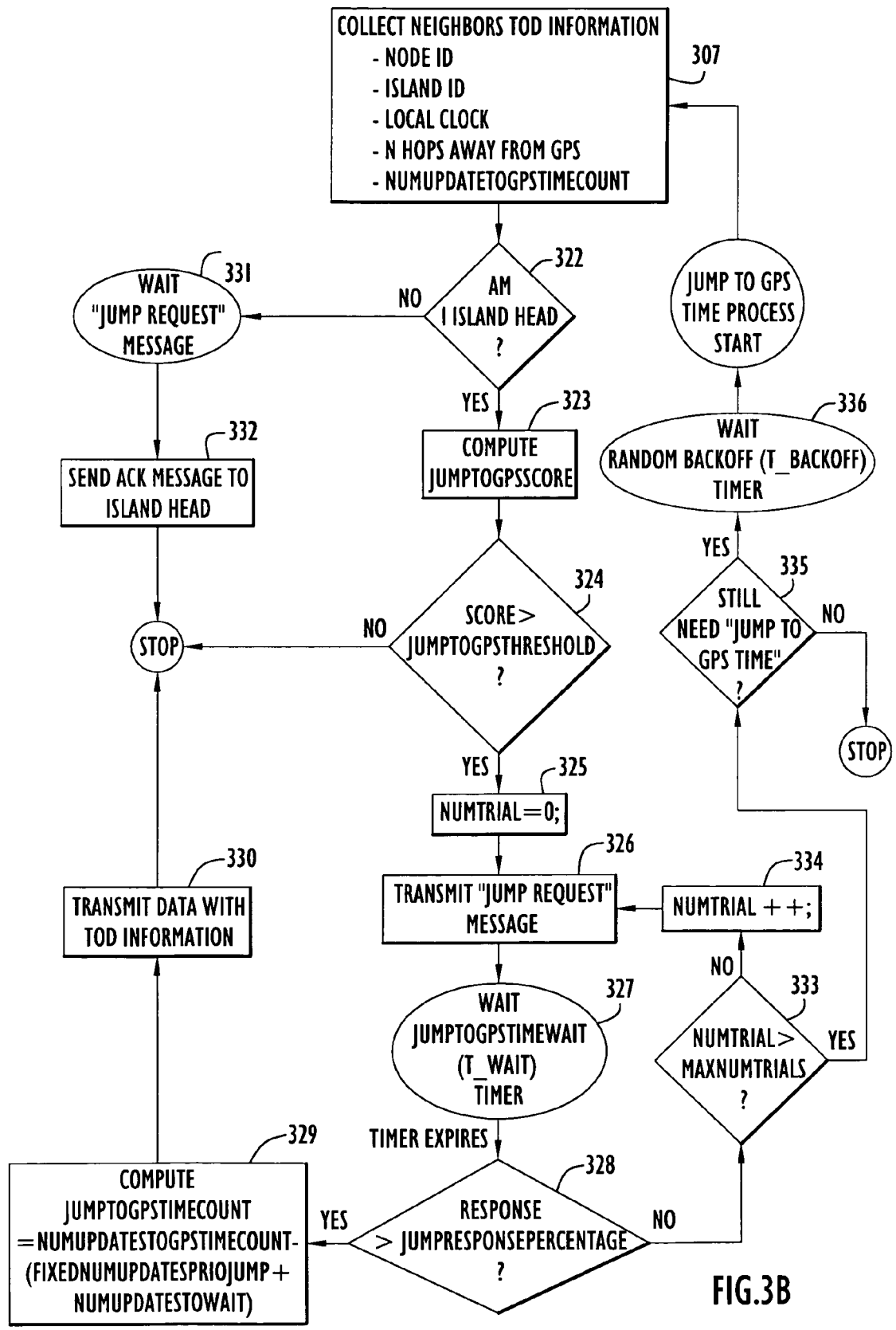

The present invention time-of-day (TOD) synchronization is performed by each network node. By way of example only, the present invention synchronization is described with respect to an exemplary SUO type network; however, the synchronization may be applied to any suitable networks. The synchronization of the present invention includes each network node formatting and transmitting time-of-day messages to another network node, and receiving time-of-day messages for predicting and updating the node internal local clock. The manner in which a network node (e.g., via processor 26) transmits a time-of-day synchronization message according to the present invention is illustrated in FIGS. 3A-3B. Specifically, the node initially determines the node status as Isolated or Associated with other nodes in the network at step 302. If the node is in an Associated state, the node transmits an LNE packet at step 306 in response to time-of-day information not being ready as determined at step 303 and the process returns to step 302 to be repeated. When the time-of-day information data is ready, the node resets the LNE packet for the last TDMA time slot within the next even epoch (e.g., message S2 within FIG. 1B) at step 304 and collects the time-of-day information (e.g., node ID (node identification), island ID (network identification), local clock (local time-of-day of node), number of hops away from a node having GPS-based time, the number of updates to GPS time, etc.) from neighboring nodes at step 307 (FIG. 3B). Each node computes the minimum number of hops away from a GPS node (NhopsAwayGpsCount) continuously when the node receives time-of-day information from neighboring nodes. A node with local GPS time sets the hop count (NhopsAwayGpsCount) to be zero, and each node receiving the relayed GPS-based time information increases or increments this count before relaying the count to a neighboring node.

When an island head node receives a non-zero update count (NumUpdatesToGpsTimeCount described below) from an island member node, the head node determines the feasibility of transitioning to GPS time without disturbing the communication link. In particular, if the node is an island head node as determined at step 322, the node determines a score value (JumpToGpsScore) at step 323 that is utilized for indicating proper conditions to transition to GPS time. The score value may be determined as follows.

$$JumpToGpsScore=(k1*(island\ size))+(k2*NumUpdatesToGpsTimeCount)$$

where k1 and k2 are predefined weight factors and NumUpdatesToGpsTimeCount is determined from a time offset between local GPS time of a node and the network time received by that node within an LNE message as described below.

The island head node compares the resulting score value to a threshold (JumpToGpsThreshold) at step 324. If the score value is greater than the threshold, the island head node initiates a negotiation process to transition to GPS time. In particular, once the score value indicates a transition, the island head node initializes a trial counter (Num Trial) at step 325 and sends a transition request message to island members at step 326. The island head node further starts a transition timer (JumpToGpsTimeWait) at step 327 and waits for expiration of an associated time interval (T_wait). When a member node receives the transition request message, the node replies with an acknowledgement (ACK) message back to the island head node. Once the time interval expires, the island head node determines the quantity of received acknowledgement messages. If acknowledgements are received from more than a predefined percentage of member nodes (JumpResponsePercentage) as determined at step 328, the island head node determines the transition time or count (JumpToGpsTimeCount) for switching to GPS time at step 329. The transition time or count may be determined as follows.

$$JumpToGpsTimeCount=NumUpdatesToGpsTimeCouunt-FixedNumUpdatesPrioJump-Integer(T_{Wait}/\Delta T_{max})$$

where NumUpdatesToGpsTimeCount is determined from the time offset between local GPS time of a node and the network time received by that node within an LNE message as described below, FixedNumUpdatesPrioJump is the amount of updates required prior to a GPS transition as described below to enable network nodes several hops away to receive a transmission and become synchronized, $T_{Wait}$ is the transition timer interval and $\Delta T_{max}$ is the update interval as described below.

Figure 5A:
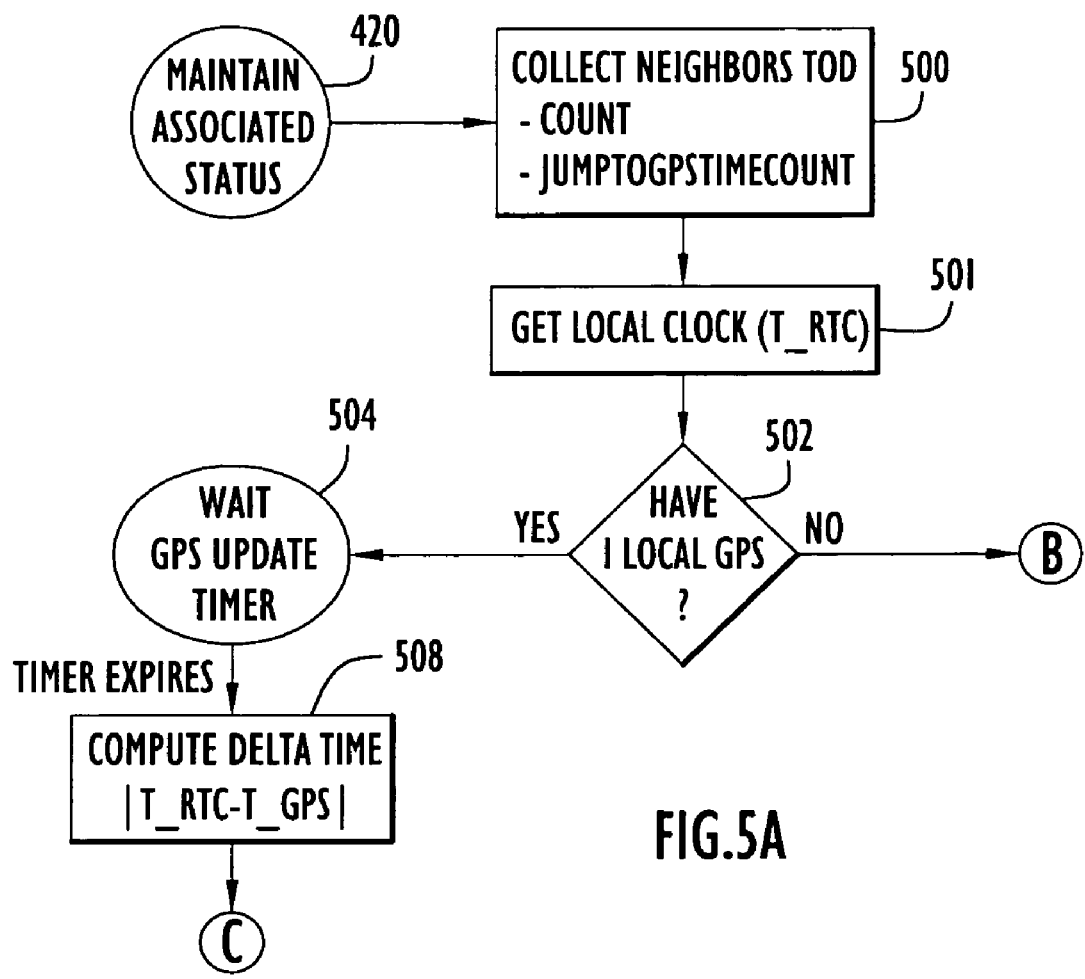
FIGS. 5A-5C are a procedural flow chart illustrating the manner in which a network node maintains an Associated status with other network nodes in accordance with the time-of-day synchronization of the present invention.
Figure 5B:
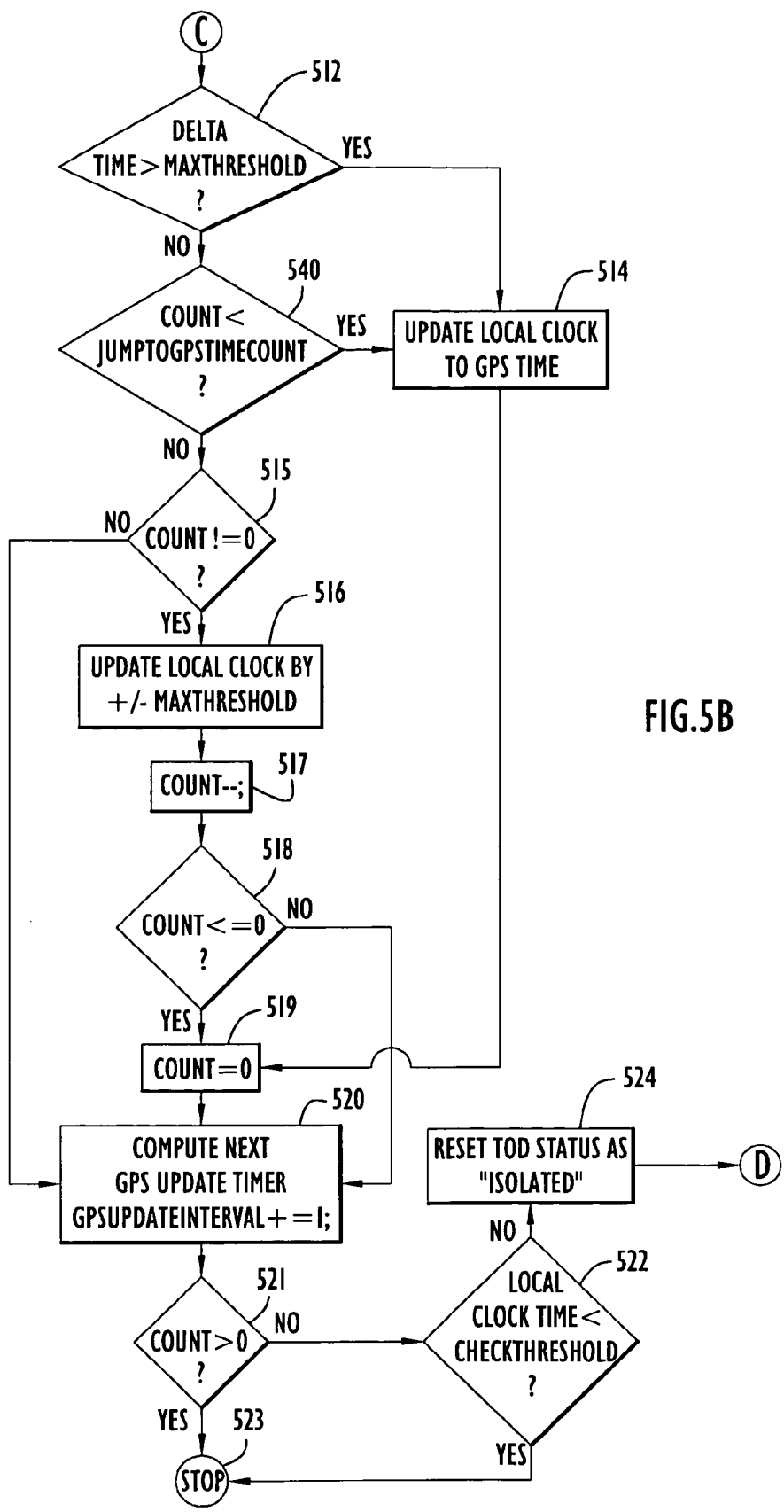
Figure 5C:
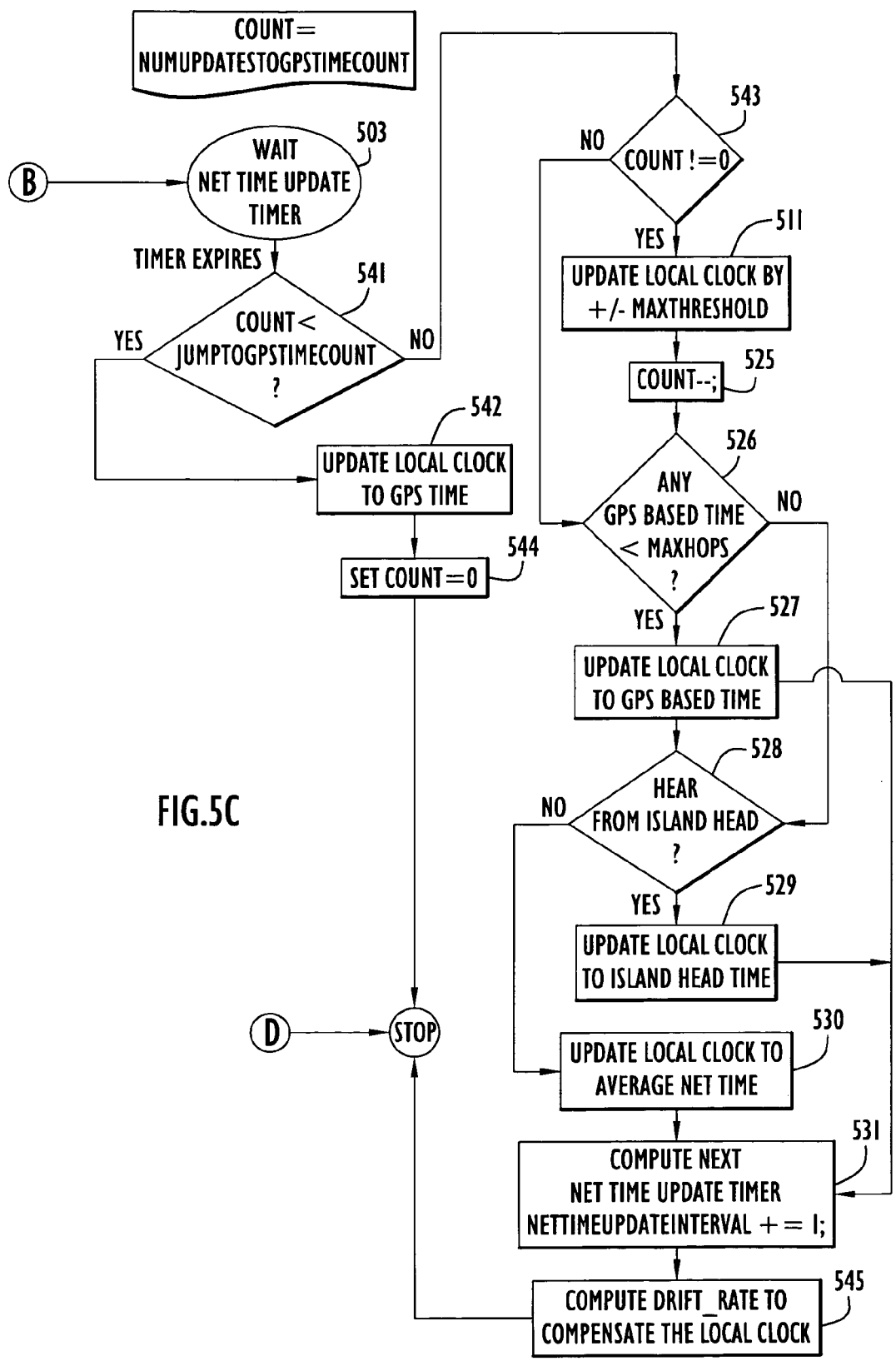

A transition confirmation message (e.g., time-of-day information including the transition count and other data) is transmitted to the member nodes at step 330. When the island member nodes receive the confirmation messages, the node network time may be updated to GPS time in response to proper conditions as described below (FIGS. 5A-5C).

Since transmissions may take several hops to be received by all network nodes, the network time is pulled for several clock time updates (FixedNumUpdatesPrioJump) to enable the network nodes to be synchronized by the update count (NumUpdatesToGPSTimeCount) prior to transitioning to GPS time. Accordingly, the head node floods the time-of-day information (including the transition time or count) after a fixed quantity of clock time updates (FixedNumUpdatesPrioJump). By way of example only, the default value for this parameter (FixedNumUpdatesPrioJump) is set to three since the average hop count in an island is approximately three hops.

If acknowledgements are received by the island head node within the transition timer interval from less than the predefined percentage of member nodes, the island head node retransmits the transition requests for a predefined number of trials (MaxNumTrials) (e.g., usually three times) as determined at steps 333, 334. If the negotiation is not successful and the pulling interval is still large as determined at step 335, the island head node delays by a random back-off interval (T_backoff) at step 336 and restarts this process again. In case some nodes do not transition to GPS time, the nodes become Isolated and retry to synchronize with existing networks. The degradation of existing communications may be regulated by controlling the value of the predefined percentage of island members acknowledging the transition request.

When the score value is less than or equal to the threshold as determined at step 324, the process terminates. For example, when an island includes a small quantity of members or the update count is low, the island head node may decide to permit nodes to continue pulling by periodic local clock updates as described below (without immediate transition to GPS time). The synchronization technique of the present invention may regulate sensitivity toward transitioning to GPS time by controlling the value of the predefined weights (e.g., k1 and k2) and/or the threshold value (JumpToGpsThreshold).

When the node is not a head node as determined at step 322, the node waits for a transition request message from a corresponding island head node at step 331 and transmits an acknowledgement in response to receiving that message at step 332. The above process is repeated while the node maintains an Associated state.

If the node is in an Isolated state as determined at step 302 (FIG. 3A), the node further determines the presence of GPS-based time at step 305. When an Isolated node has GPS-based time, the node sets the node local clock time to GPS-based time and transmits PROP and LNE signals (e.g., FIG. 1A). If this node does not attain an Associated status in a predetermined time interval (e.g., remains in an Isolated state), the node listens for LNE signals from RF neighboring nodes as described below. In particular, when the node has GPS-based time as determined at step 305, the node checks for newly available GPS time at step 308. When a new GPS time is available, the local clock of the node is updated to GPS-based time at step 311. Regardless of the availability of a new GPS time, the node transmits PROP and LNE packets at step 313 (FIG. 1A). A wait time (IN_SYNC_TIME) for a timer is set at step 314 after transmission of the packets at step 313, or in response to an In Sync node state as determined at step 302. The node status is examined after the timer interval. If the node attains an Associated state as determined at step 317, the node status is set to Associated at step 320. However, when the node status remains as Isolated or In Sync after expiration of the timer as determined at step 317, the node status is set to Isolated at step 321. The above process returns to step 302 and is repeated.

When the node lacks GPS-based time, the node does not transmit LNE signals until a specified waiting interval expires. In particular, when the node lacks GPS based time as determined at step 305, the node local clock is set manually at step 309 and the node sets a wait time (WAIT_LNE_XMT_TIME) for a timer at step 312 and transmits an LNE packet at step 318 after expiration of the timer. However, the node receives RF neighboring node LNE signals and sets the node local clock with the time received in the LNE packet at step 315. The node further sets the node status as In Sync at step 319. The process returns to step 302 to be repeated.

Figure 4A:
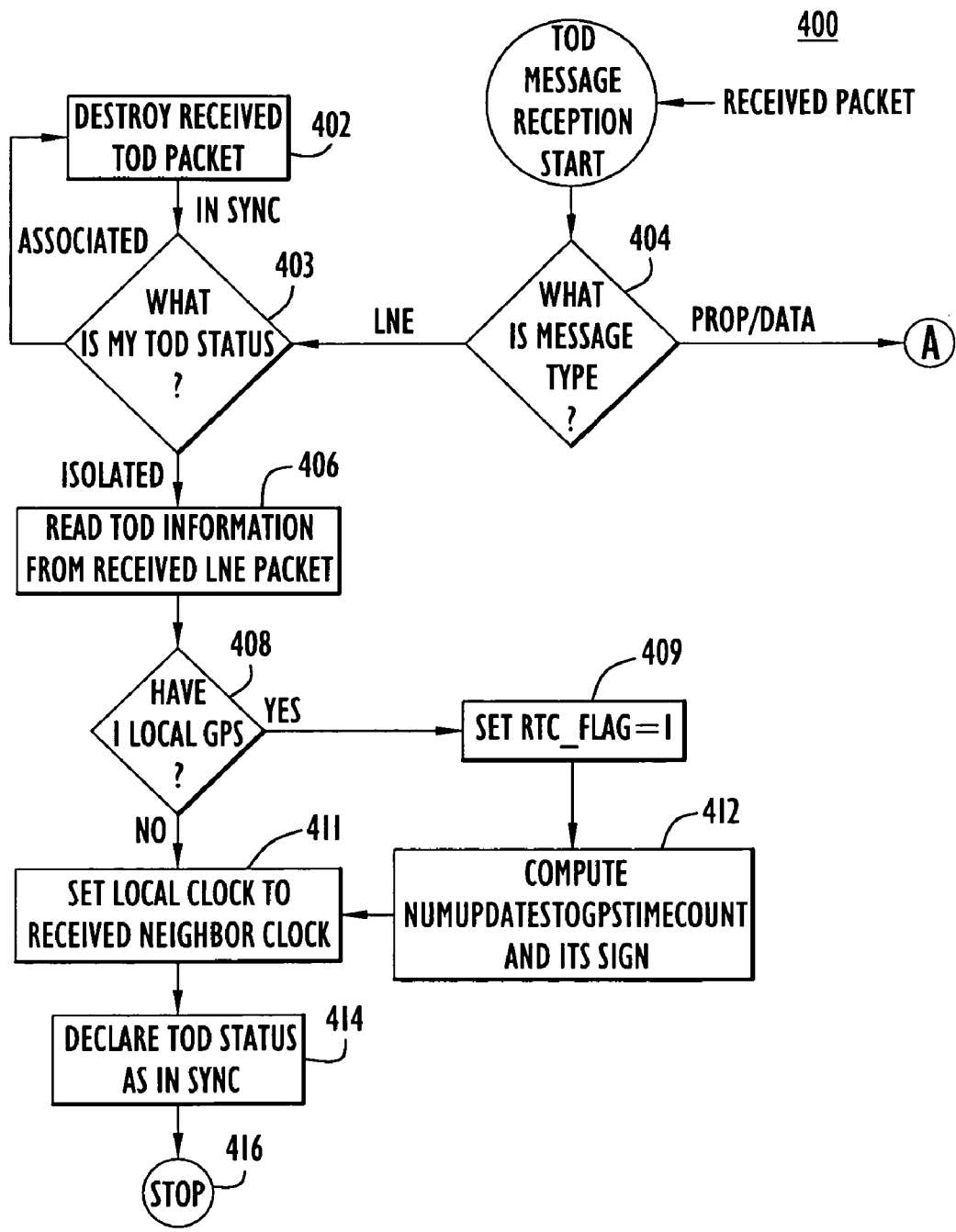
FIGS. 4A-4B are a procedural flow chart illustrating the manner in which time-of-day synchronization messages are received and processed by a network node in accordance with the time-of-day synchronization of the present invention.
Figure 4B:
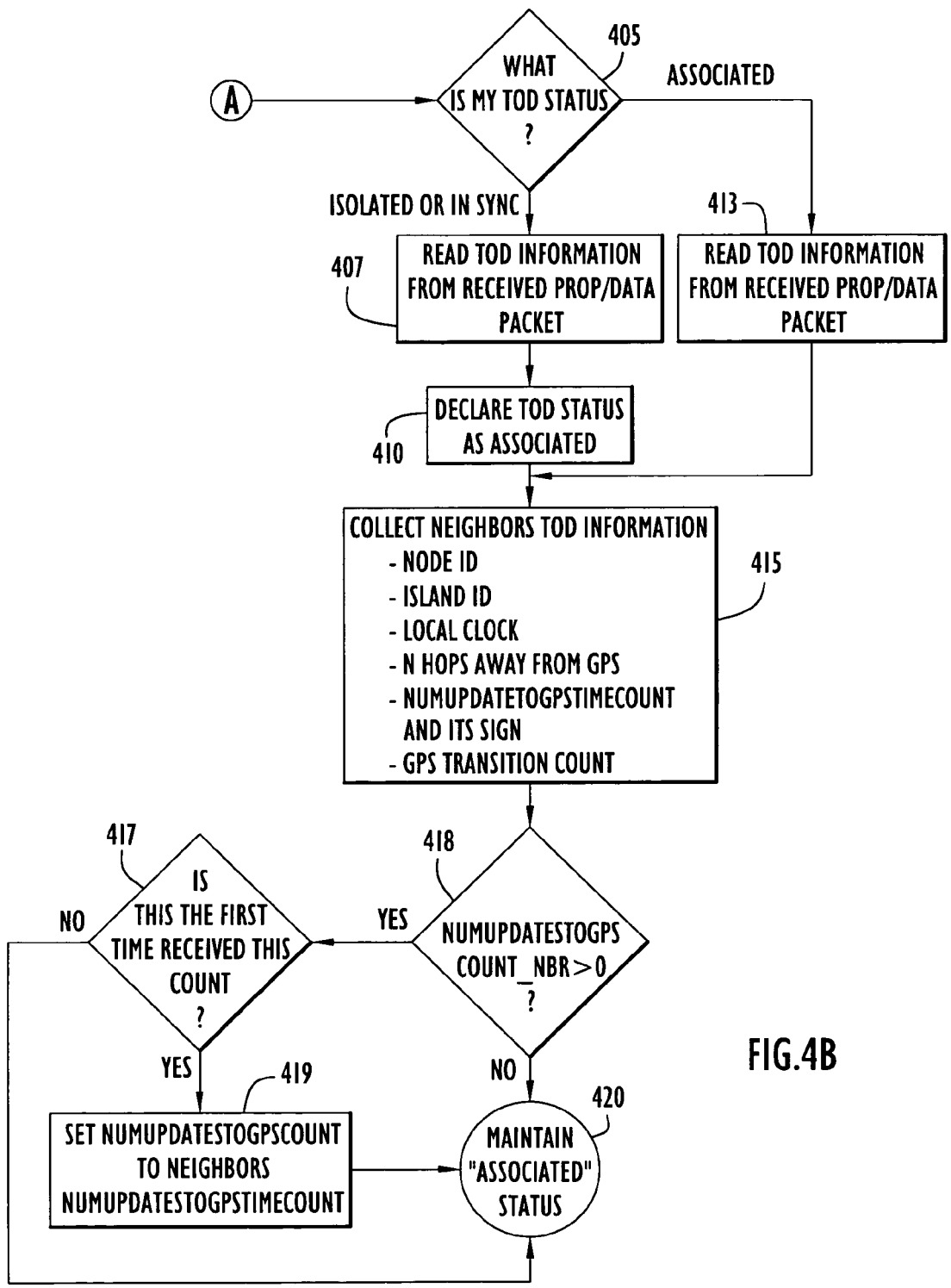

The manner in which a network node (e.g., via processor 26) receives and processes time-of-day synchronization messages according to the present invention is illustrated in FIGS. 4A-4B. Specifically, the node identifies the type of message received at step 404. The message is typically received from a neighboring node. If the received message is a PROP or data type message (e.g., confirmation message from a head node for transitioning to GPS time, time-of-day information from a neighboring node, etc.), the node determines the time-of-day node status at step 405. If the node status is Isolated or In Sync, the node retrieves the time-of-day information from the message or packet at step 407. After examining the received message, the node declares the status of the node as Associated at step 410. If the node has an Associated status as determined at step 405, the time-of-day information is read at step 413. The neighboring node time-of-day information (e.g., node ID (node identification), island ID (network identification), local clock (local time-of-day of neighboring node), number of hops away from a node having GPS-based time, the number of updates to GPS time, count to the GPS transition) within the message is collected at step 415.

The node examines an update count (NumUpdatesToGpsTimeCount described below) received from the neighboring node at step 418. An update count greater than zero indicates that a node in the network has GPS-based time and is gradually attempting to pull the network non-GPS based time-of-day toward the GPS-based time. An update count equal to zero indicates that there is no pulling activity in the network. A positive value of the update count may be replaced and the sign of the value added to the time-of-day information. When the initial non-zero value of the update count (NumUpdatesToGpsTimeCount) is received in a node from a neighboring node, that value becomes the update count in the receiving node. The value of the update count is decremented at the receiving node as described below (FIGS. 5A-5C) and transmitted in the time-of-day information to another network node (FIGS. 3A-3B). In other words, when an initial non-zero value of the update count is received by a node from neighboring nodes, the initially received value becomes the update count in that node. Once a node local clock time is updated by the maximum clock update value ($\Delta t_{max}$ described below), the update count (NumUpdatesToGpsTimeCount) is decremented and transmitted to neighboring nodes as described below (FIGS. 5A-5C). Specifically, if the update count is greater than zero (e.g., indicating pulling activity in the network) as determined at step 418, the node sets the update count value of the node to the received update count value at step 419 in response to the reception being an initial reception of the count as determined at step 417. The node subsequently performs time-of-day maintenance at step 420 as described below. When the update count has a value of zero (e.g., indicating no pulling activity in the network) as determined at step 418, the node performs time-of-day maintenance at step 420 as described below.

If the received message is an LNE type message as determined at step 404, the node determines the node time-of-day status at step 403. When the node has an In Sync or Associated status, the received time-of-day packet is ignored or discarded at step 402. However, when the node status is Isolated, and the node receives an LNE signal from another network node, the node local clock is synchronized with the time information contained in that signal. The Isolated node enters an In Sync state and starts to transmit PROP and LNE messages (FIG. 1A) without delays (TODXmitDelay or TODXmtRepeat). In particular, the Isolated node examines the time-of-day information in the received LNE packet at step 406. If the node lacks local GPS-based time as determined at step 408, the node local clock is set to the received neighboring node local clock at step 411 and the node status is declared as In Sync at step 414. The processing of the received message subsequently terminates at step 416. When the In Sync node subsequently receives PROP or data messages, the node becomes Associated and is ready to communicate with RF neighboring nodes as described above. The Associated node transmits LNE signals periodically (FIG. 1B).

When an Isolated node with local GPS time tries to synchronize with the existing network time (e.g., non-GPS based time), the node sets the node local clock time with time-of-day information in the received LNE message in order to synchronize with the network immediately. The node subsequently determines the update count (NumUpdatesToGpsTimeCount) and adds this information to the time-of-day information in the synchronization. The number of updates to the GPS time (NumUpdatesToGpsTimeCount) is an integer-value determined by an Isolated node synchronizing with existing network time. This update parameter is determined from the time offset between local GPS time of a node and the network time received by that node within an LNE message. Since a round-off error ($\epsilon$) arising within the determination of the update parameter (NumUpdatesToGpsTimeCount) as an integer value may cause fragmented networks at the transition to GPS time, the round-off error ($\epsilon$) must be accounted for at the time of transition to the common GPS time. In particular, if the Isolated node has GPS-based time as determined at step 408, a pulling flag (RTC_flag) is set (e.g., to a value of one) at step 409. The pulling flag is set to indicate that the node with local GPS time has set the node local clock to the time-of-day received in an LNE message and intends to join the network as soon as possible and cause the local network time to synchronize to GPS-based time. If the pulling flag is set in a local node, the local node slowly pulls the network time to GPS-based time. Otherwise, neighboring node information is collected during a time window and the local node uses this information to update the node local clock. The local clock time, the number of hops away from a GPS node, an update count and other time-of-day information are transmitted in a communication packet to neighboring nodes as described above.

Once the pulling flag is set, the node determines an integer value of the update count (NumUpdatesToGpsTimeCount) including a corresponding value sign (e.g., positive or negative) at step 412. For example, a positive sign may indicate that the GPS-based time leads the received neighboring node local clock, while a negative sign may indicate that the GPS-based time lags the received neighboring node local clock. The update count is determined based on the following expression:

NumUpdatesToGPSTimeCount=
Integer$\{(t_{GPS}-t_{RTC})/\Delta t_{max}\}$ where $t_{GPS}$ is the GPS (or real) time, $t_{RTC}$ is the local clock time and $\Delta t_{max}$ is the maximum value of local clock time that the node local clock may be updated without losing time-of-day synchronization with a neighboring node (e.g., 200 microseconds). The number of updates to the GPS time (NumUpdatesToGpsTimeCount) is an integer-value based on the time offset between local GPS time of the node and the network time received by that node within the LNE message. Once the update count value is determined, the node local clock is set to the receiving neighboring node local clock at step 411 and the node status is declared as In Sync at step 414. The processing of the received message subsequently terminates at step 416.

The manner in which a node maintains an Associated state according to the present invention is illustrated in FIGS. 5A-5C. Initially, when an update interval expires, the local clock time of a node (with or without GPS time) is updated by $\Delta t_{max}$ until the update count (NumUpdatesToGpsTimeCount) becomes zero as described below. The update intervals are typically the same for all network nodes (e.g., one second, etc.). Specifically, neighbor information (e.g., update count, transition count, etc.) are initially collected at step 500 and the local clock time (T_rtc) of the node is ascertained at step 501. The node subsequently determines the presence of GPS time at step 502. If the node has GPS-based time, the node waits for an update timer to expire at step 504 (e.g., one-second update time interval). The update interval of the node with local GPS is preferably one-second since GPS sends the time information to the node at one second (1 PPS) intervals and the node is required to update the local clock upon availability of the GPS signal. The node determines an absolute value of the difference between the local clock time, $t_{RTC}$, and GPS time, $t_{GPS}$, (e.g., $|t_{GPS}-t_{RTC}|$) representing a delta time or offset at step 508.

If the delta time exceeds a maximum threshold value (e.g., 200 microseconds) as determined at step 512, the node updates the node local clock to GPS-based time at step 514 and resets the update count (NumUpdatesToGpsTimeCount) to zero at step 519. When the delta time is less than or equal to the maximum threshold value as determined at step 512, the update count (NumUpdatesToGpsTimeCount) is compared with the transition count (JumpToGpsTimeCount) at step 540. If the value of the update count (NumUpdatesToGpsTimeCount) is less than that of the transition count (JumpToGpsTimeCount) (e.g., indicating that the node will reach GPS time before the GPS transition time and, therefore, can immediately transition to GPS time without significantly affecting communications), the node local clock time is updated with the GPS time at step 514 as described above.

When value of the update count is greater than or equal to the value of the transition count (e.g., indicating that the node will not reach GPS time before the GPS transition time and, therefore, cannot immediately transition to GPS time without significantly affecting communications) as determined at step 540, the node compares the update count to zero at step 515. If the update count is not equal to zero (e.g., indicating the presence of pulling activity and that updates are to be performed), the node updates the node local clock by the maximum threshold value (e.g., by +/−the maximum threshold value, $\Delta t_{max}$) at step 516 and decrements the update count at step 517. When the update count (NumUpdatesToGpsTimeCount) is less than or equal to zero as determined at step 518, the update count is reset to zero at step 519 as described above. The node determines the next GPS update interval at step 520 subsequent resetting of the update count at step 519, or in response to the update count (NumUpdatesToGpsTimeCount) being greater than zero as determined at steps 515, 518.

Once the update interval is determined, the node subsequently compares the update count (NumUpdatesToGpsTimeCount) to zero at step 521. If the update count is not greater than zero and the node does not hear from other nodes after a predetermined time interval expires (e.g., ten seconds, etc.) as determined at step 522, the node resets the node time-of-day status to Isolated at step 524. The process terminates at step 523 after resetting of the node status at step 524, in response to the update count being greater than zero as determined at step 521, or in response to hearing from another node within the predetermined interval as determined at step 522.

If a node has no local GPS time and is ready to transition to GPS time, the remaining number of updates between the update count (NumUpdatesToGpsTimeCount) and transition count (JumpToGpsTimeCount), and the round-off error ($\epsilon$) are used to reset the local clock time with GPS time. Once the local clock is reset, the value of the update count (NumUpdatesToGpsTimeCount) is set to zero to complete the process as described below. In particular, if the node does not have GPS-based time as determined at step 502, the node waits for a network time update timer to expire (e.g., a one second time interval) as determined at step 503. The nodes without GPS time preferably update node clocks at one second intervals similar to the updates for GPS based nodes. The one second update time interval ($\Delta T_{max}$) is selected based on an optimum value determined from parameterizing the interval in a simulation.

Once the timer expires, the node compares the update count (NumUpdatesToGpsTimeCount) with the transition count (JumpToGpsTimeCount) at step 541. If the value of the update count (NumUpdatesToGpsTimeCount) is less than that of the transition count (JumpToGpsTimeCount) (e.g., indicating that the node will reach GPS time before the GPS transition time and, therefore, can immediately transition to GPS time without significantly affecting communications), the node local clock time is updated with the GPS time at step 542 and the update count is reset to zero at step 544.

When the value of the update count is greater than or equal to the value of the transition count (e.g., indicating that the node will not reach GPS time before the GPS transition time and, therefore, cannot immediately transition to GPS time without significantly affecting communications) as determined at step 541, the node compares the update count to zero at step 543. If the update count is not equal to zero (e.g., indicating the presence of pulling activity and that updates are to be performed), the node updates the node local clock by the maximum threshold value (e.g., by +/−the maximum threshold value, $\Delta t_{max}$) at step 511 and decrements the update count at step 525.

Once the update count is decremented, or in response to the update count being zero as determined at step 543, the node updates the node local clock to GPS-based time at step 527 in response to the GPS time being available from a node that is less than a predetermined maximum number of hops away (e.g., less than three hops away) as determined at step 526.

If the GPS-based time is not available as determined at step 526, the node checks for communications from an island head node at step 528. When the node has received a communication from the island head node, the node local clock is updated to the local clock time of the island head node at step 529. Otherwise, the node local clock is updated to the average network time among neighboring nodes at step 530. The node determines or increments the update timer (e.g., one second) at step 531 subsequent the local clock updates of steps 527 or 530.

When time-of-day information is received from neighboring nodes with GPS based time, a clock drift rate can be computed and averaged. The estimated clock drift rates are averaged over time and must be compensated or accounted for in the clock updates to avoid fragmented networks when a node cannot receive GPS based time during the updates. Accordingly, a clock drift rate is determined at step 545 subsequent determination of the update timer at step 531 to compensate the local clock. The drift rate is determined as follows.

$$t_i' = t_{i-1}' + \Delta T_{max}$$

$$\text{Drift\_Rate} = t_i - t_i'$$

where $t_i'$ and $t_{i-1}'$ are the current and previous local clock time updates, $t_i$ is the received GPS based time from neighboring nodes and $\Delta T_{max}$ is the update interval. The process subsequently terminates at step 523.

Ad-hoc networks use a synchronization scheme that allows synchronization between neighboring nodes located one-hop away from each other. Consequently, the rate at which the time spreads throughout the network is dependent on the number of nodes in the network and the capability for direct communication between the nodes.

In order to evaluate the time-of-day synchronization of the present invention in tactical ad-hoc networks, performance of the synchronization is described within three exemplary scenarios or network configurations including a single tier configuration (e.g., all nodes reside in the same tier), a two tier configuration (e.g., nodes reside in both first and second tiers) and a configuration with two fragmented networks. The fragmented network configuration illustrates the effectiveness of the synchronization for a merge. By way of example only, the tactical radios within the configurations are equipped with an imperfect hardware clock oscillator. The exact clock drift is difficult to predict since the drift depends on the tactical environment (e.g., temperature, pressure, power voltage, etc.). A typical value for clock drift rate is assumed to be $+/-10^{-6}$, where the local clock drifts away from real-time by no more than one second in ten days. The maximum clock drift value of each node is selected randomly in $+/-3$ part per million (ppm) increments.

Figure 6:
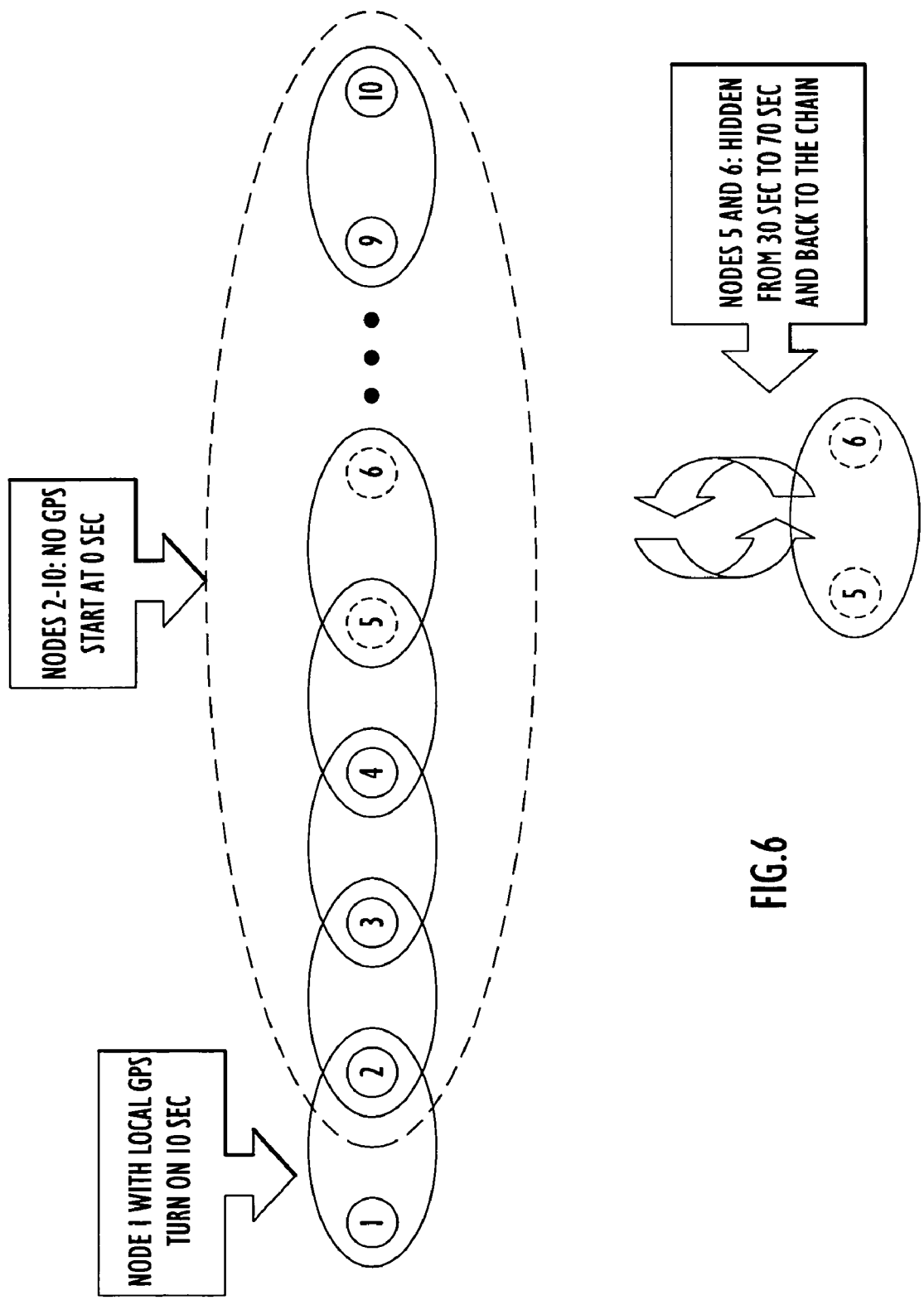
FIG. 6 is a diagrammatic illustration of an exemplary communication network with network nodes arranged in a single tier.
Figure 7:
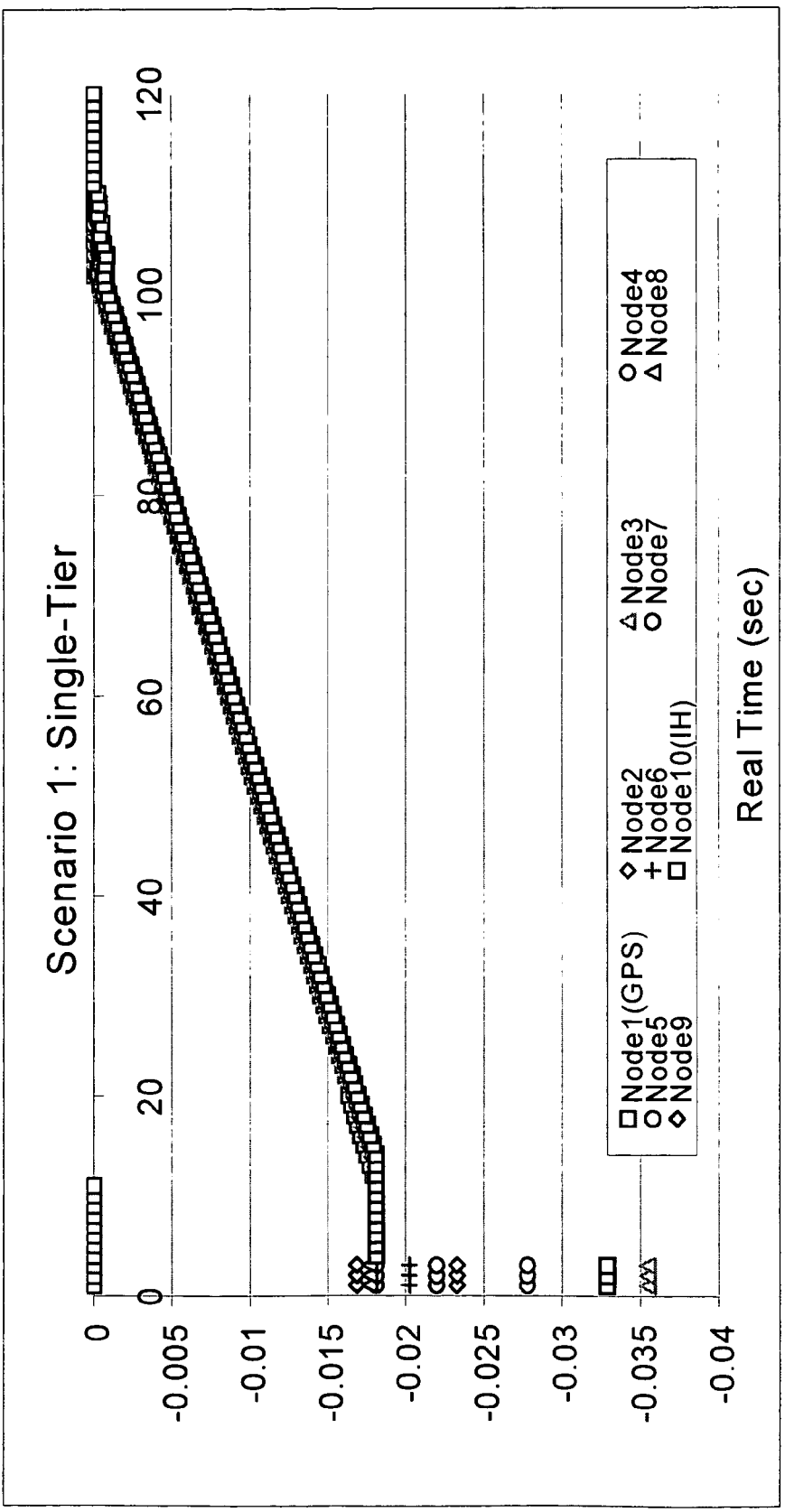
FIG. 7 is a graphical plot illustrating the performance of the flywheel technique within the network of FIG. 6.

An exemplary single tier configuration is illustrated in FIG. 6. Specifically, the configuration includes nodes 1-10 with nodes 2-10 arranged in a single tier. Node 1 includes GPS time and is accessible by node 2. Nodes 5-6 lose and regain connectivity with the network tier. The pulling of network time by the flywheel technique is illustrated in FIG. 7. The initial time offset of network time from the GPS time is 0.018134 seconds at a real time of 11.145 seconds. The time for the network time to lock to the GPS time is approximately 100 seconds.

Figure 8A:
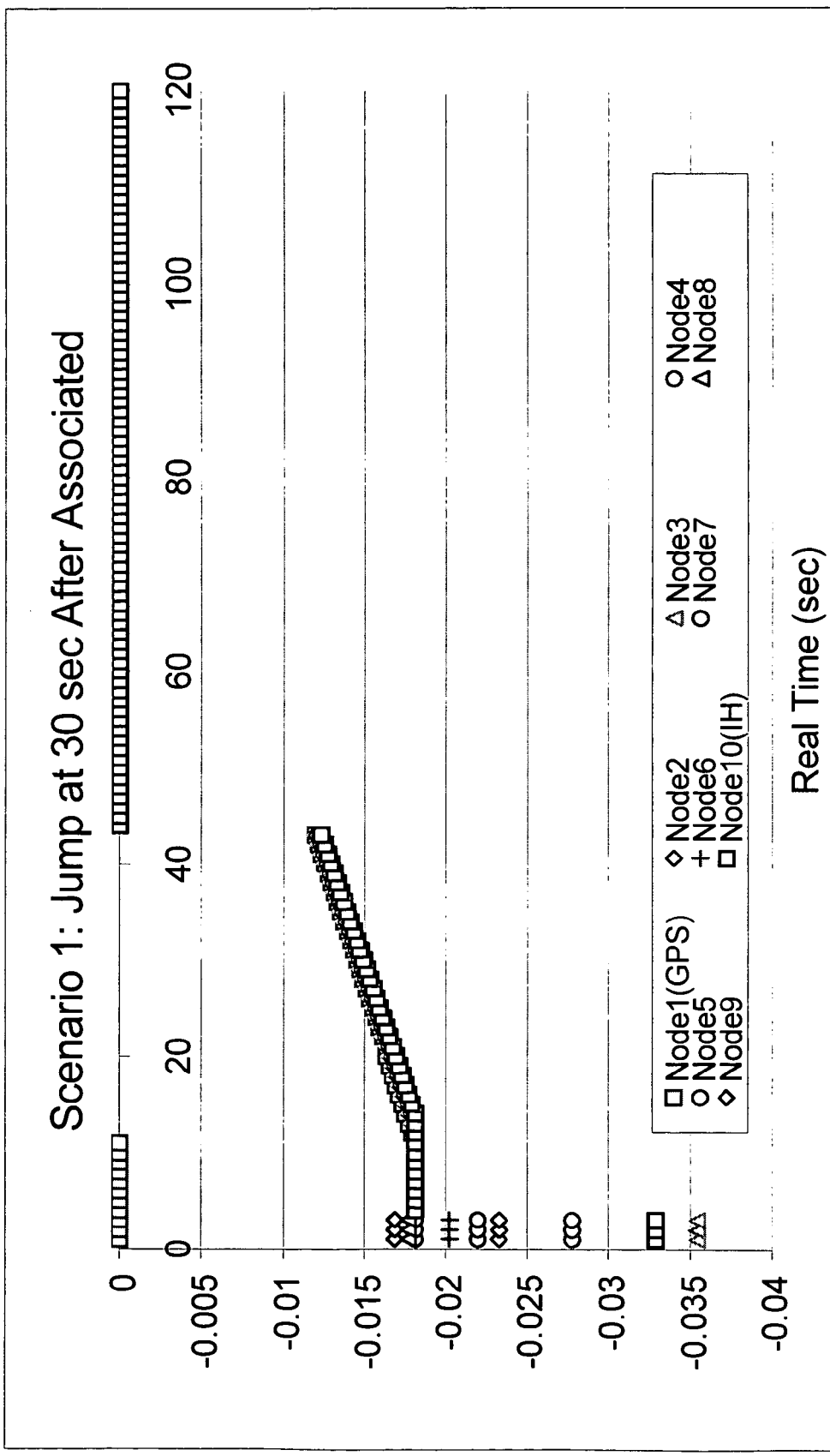
FIGS. 8A-8B are graphical plots illustrating the performance of the time-of-day synchronization according to the present invention within the network of FIG. 6.
Figure 8B:
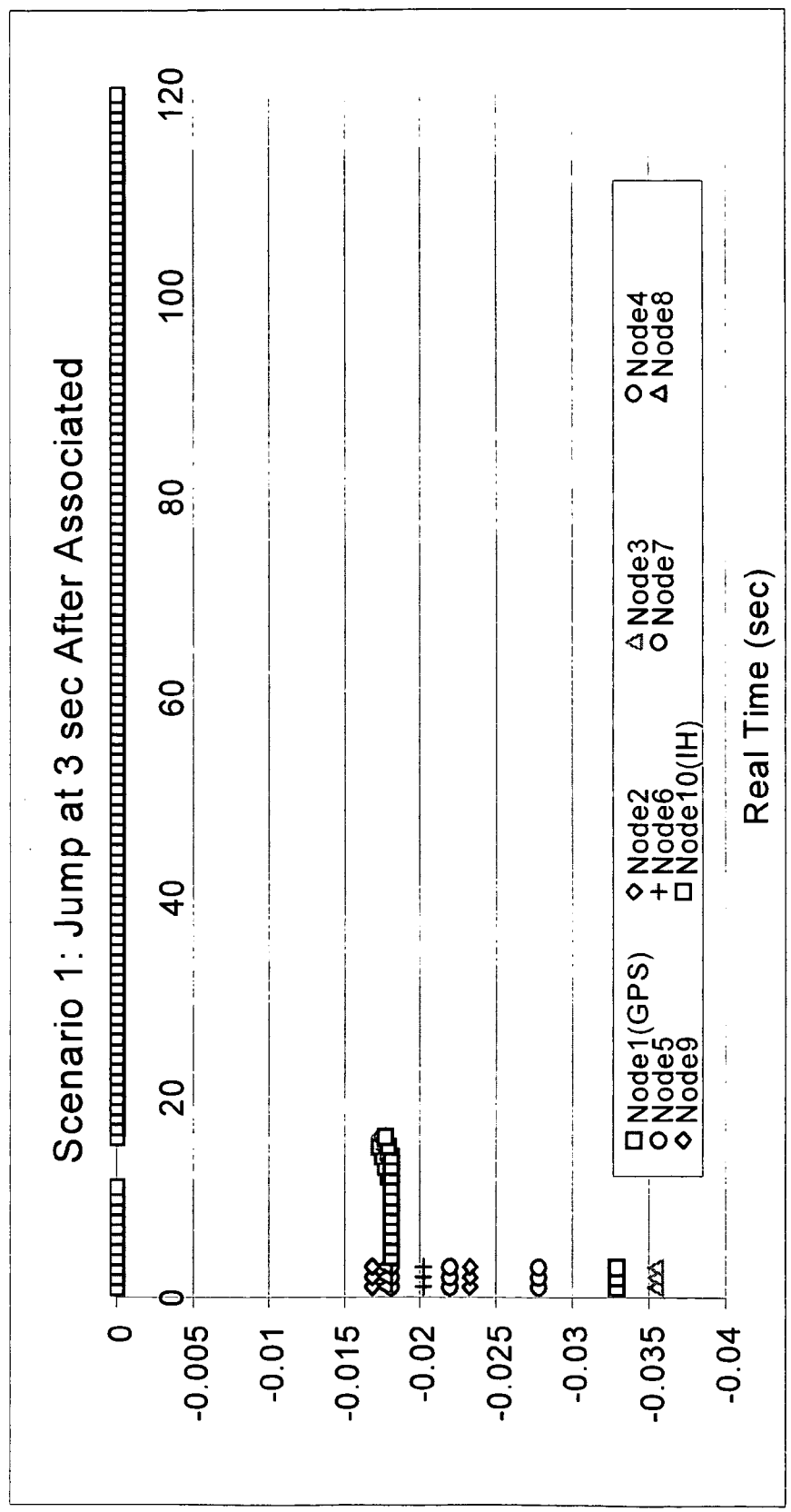

The improvement achieved with the present invention synchronization is illustrated in FIGS. 8A-8B. The initial time offset of network time from the GPS time is 0.018133 seconds (a real time of 11.96314 seconds). An identical random seed was used to get an identical time offset at the beginning of an Associated status to show the effectiveness of the present invention synchronization. The time to reach the common GPS time with the flywheel technique is approximately 100 seconds. However, with respect to the present invention synchronization, the island head determines to transition to GPS time at thirty seconds and GPS time synchronization is accomplished at approximately forty-two seconds (FIG. 8A). The network time may alternatively transition to the GPS time immediately after a predetermined quantity of updates (e.g., three updates) when the island head decides to transition based upon the network status. In this case, GPS time synchronization is accomplished at approximately eighteen seconds (FIG. 8B).

Figure 9:
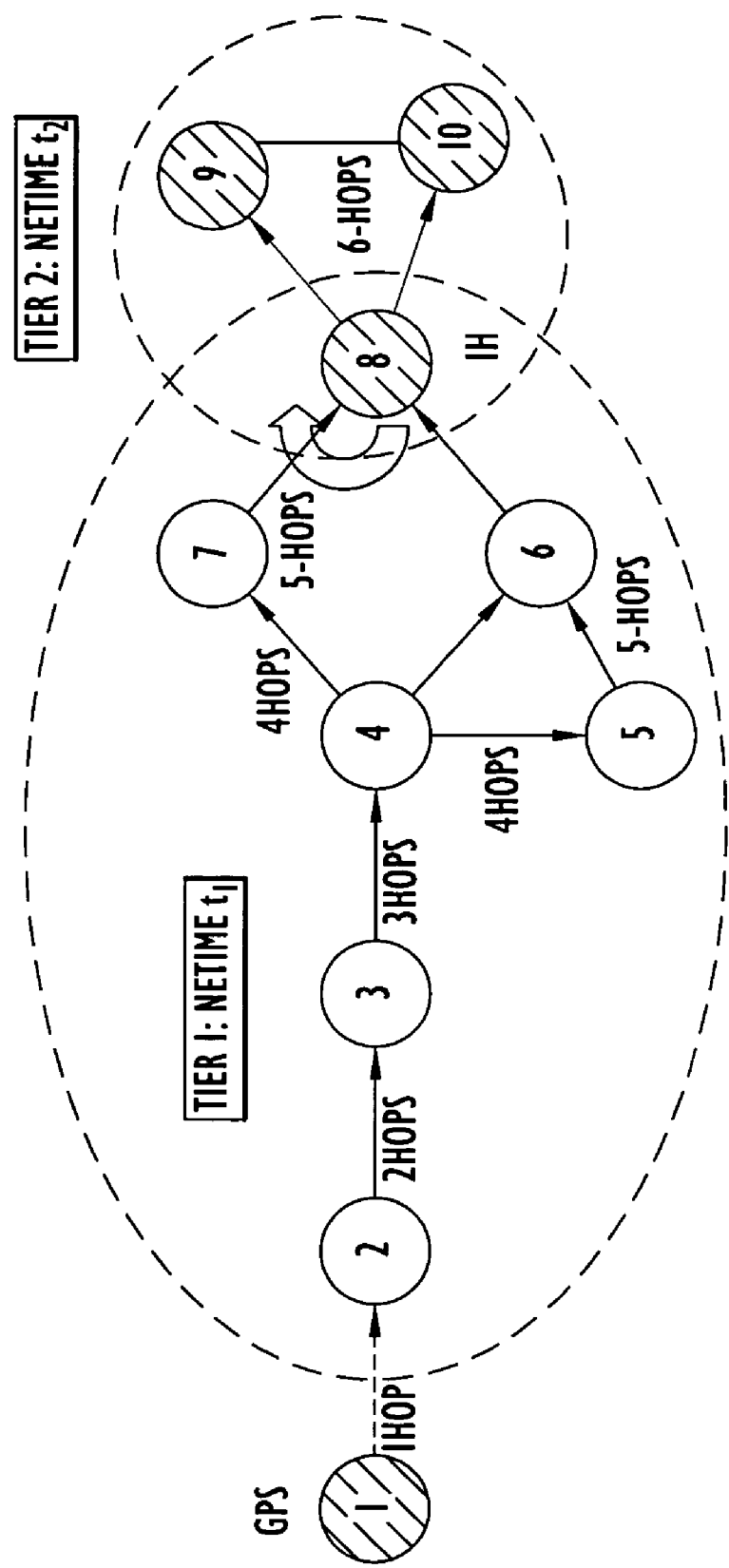
FIG. 9 is a diagrammatic illustration of an exemplary communication network with network nodes arranged in plural tiers.
Figure 10:
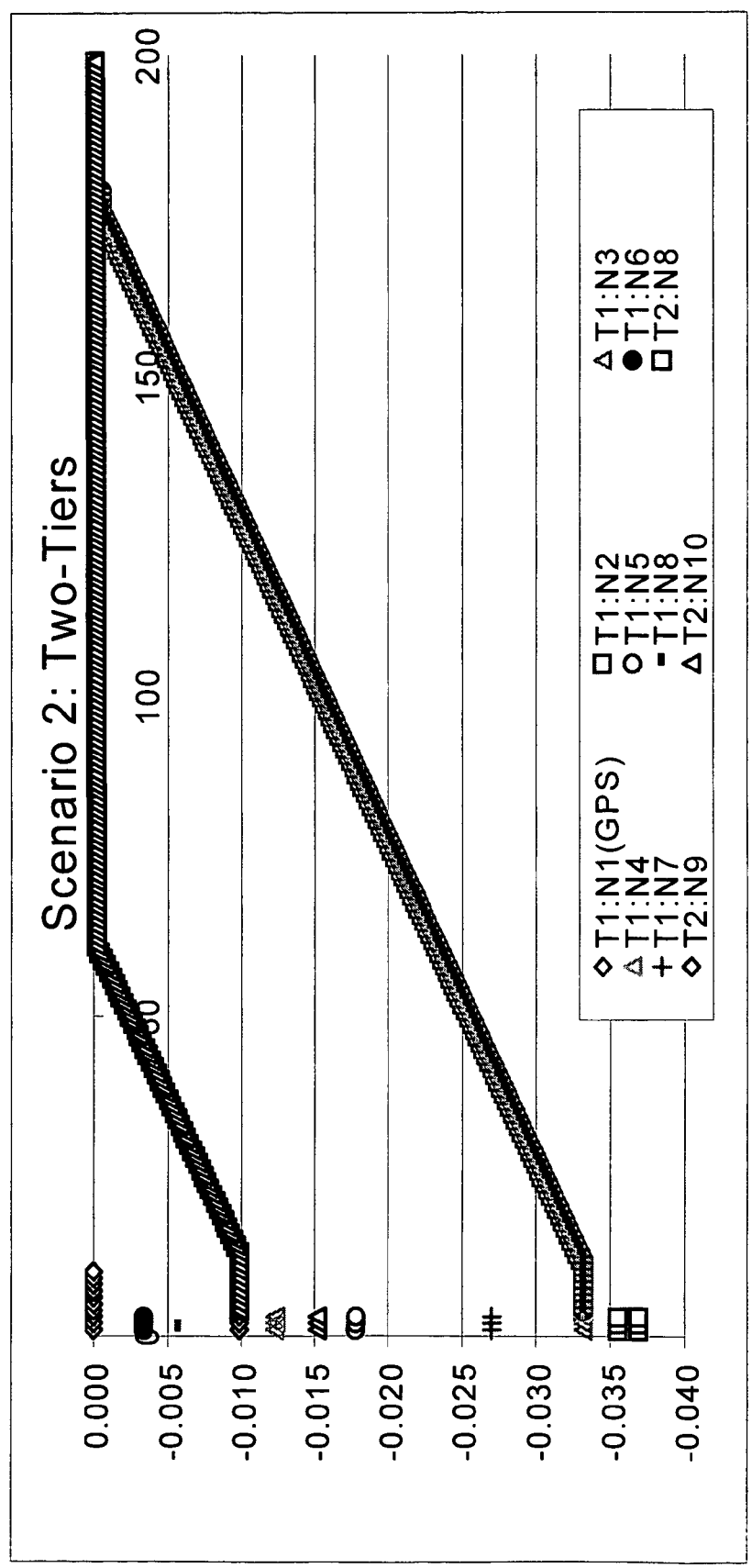
FIG. 10 is a graphical plot illustrating the performance of the flywheel technique within the network of FIG. 9.

An exemplary two tier configuration is illustrated in FIG. 9. Specifically, the configuration includes nodes 1-10 with nodes 2-10 arranged in two tiers. Nodes 2-7 reside within a first tier and nodes 8-10 reside within a second tier with node 8 designated as an island head. Node 1 includes GPS time and is accessible by node 2. The pulling of network time in the first and second tiers by the flywheel technique is illustrated in FIG. 10. The initial time offsets of network time from GPS time for the first and second tiers are approximately −0.00987 and −0.03319 seconds, respectively, at a real time of 11.145 seconds. The time for the network time of the first and second tiers to reach GPS time is approximately one-hundred sixty-four seconds and forty-eight seconds, respectively.

Figure 11A:
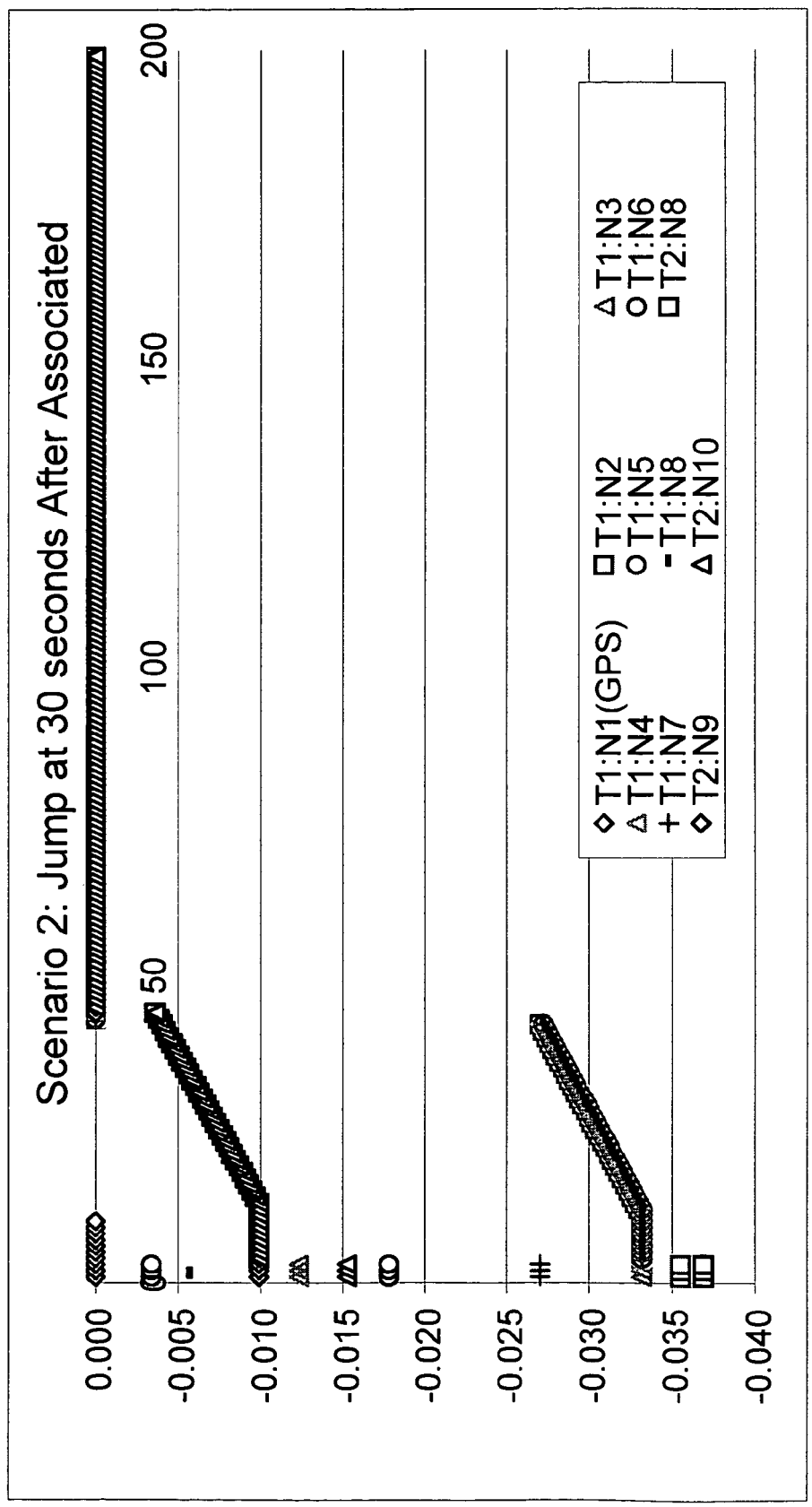
FIGS. 11A-11B are graphical plots illustrating the performance of the time-of-day synchronization according to the present invention within the network of FIG. 9.
Figure 11B:
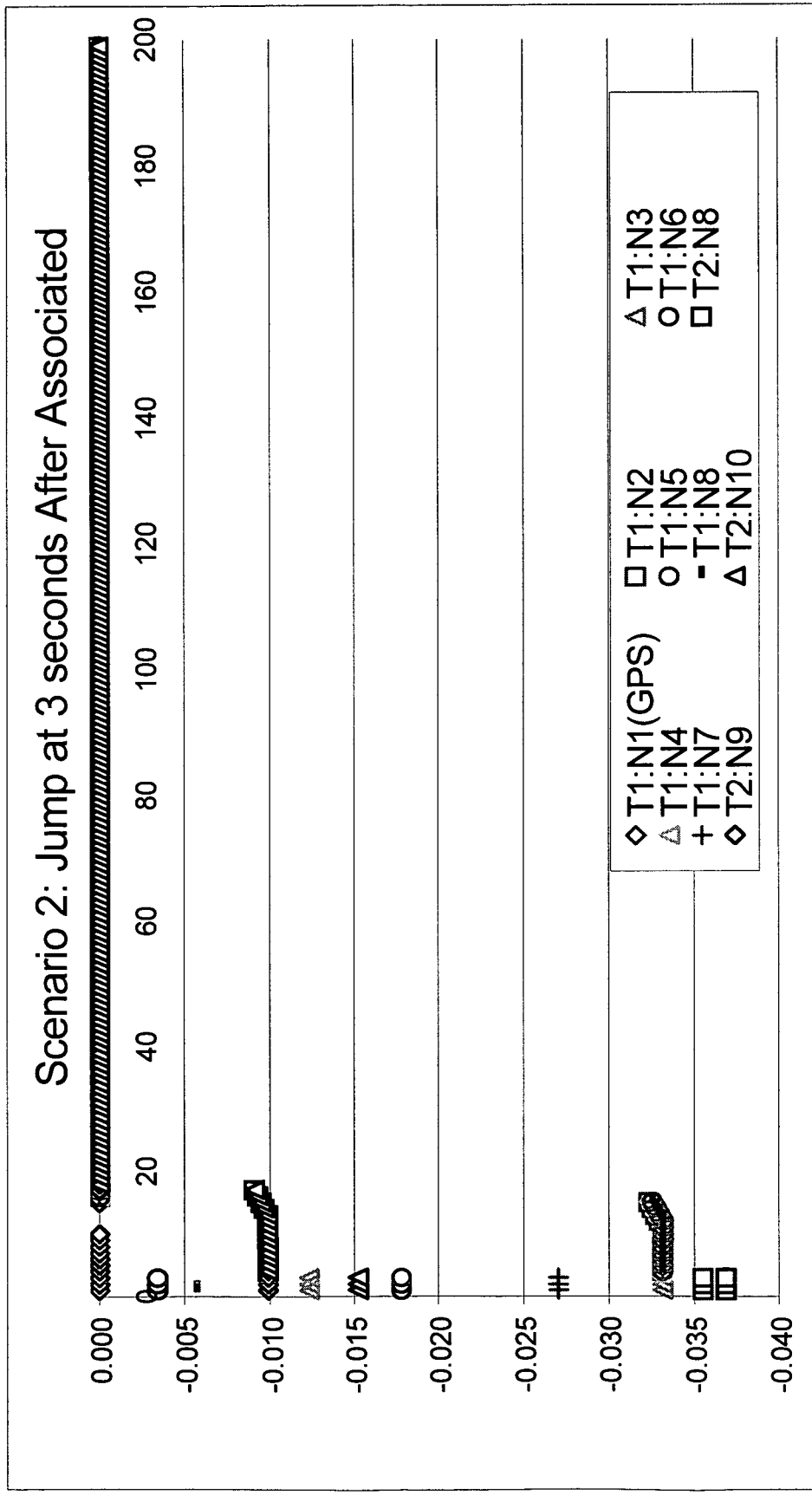

The improvement achieved with the present invention synchronization is illustrated in FIGS. 11A-11B. The network times of both tiers reach the common GPS time at the same instant so that an island merge may be implemented. The island head node determines to transition to GPS time at thirty seconds and GPS time synchronization is accomplished at approximately forty-eight seconds for both tiers with the present invention (FIG. 11A). The network time may alternatively transition to the GPS time immediately after a predetermined quantity of updates (e.g., three updates) when the island head node decides to transition based upon the network status. In this case, GPS time synchronization is accomplished for both tiers at approximately eighteen seconds (FIG. 11B).

Figure 12:
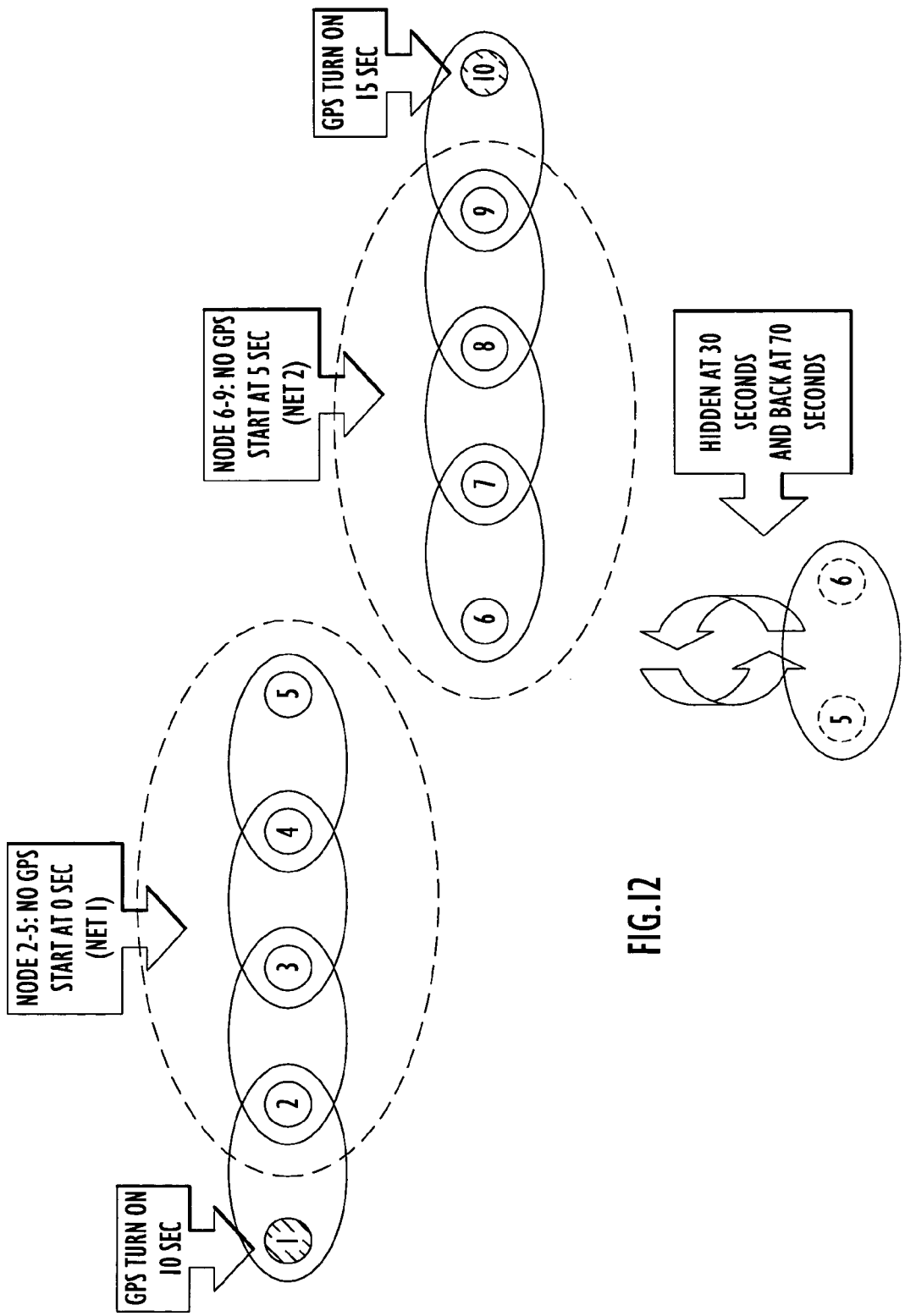
FIG. 12 is a diagrammatic illustration of an exemplary communication network with network nodes arranged in a plurality of fragmented networks.
Figure 13A:
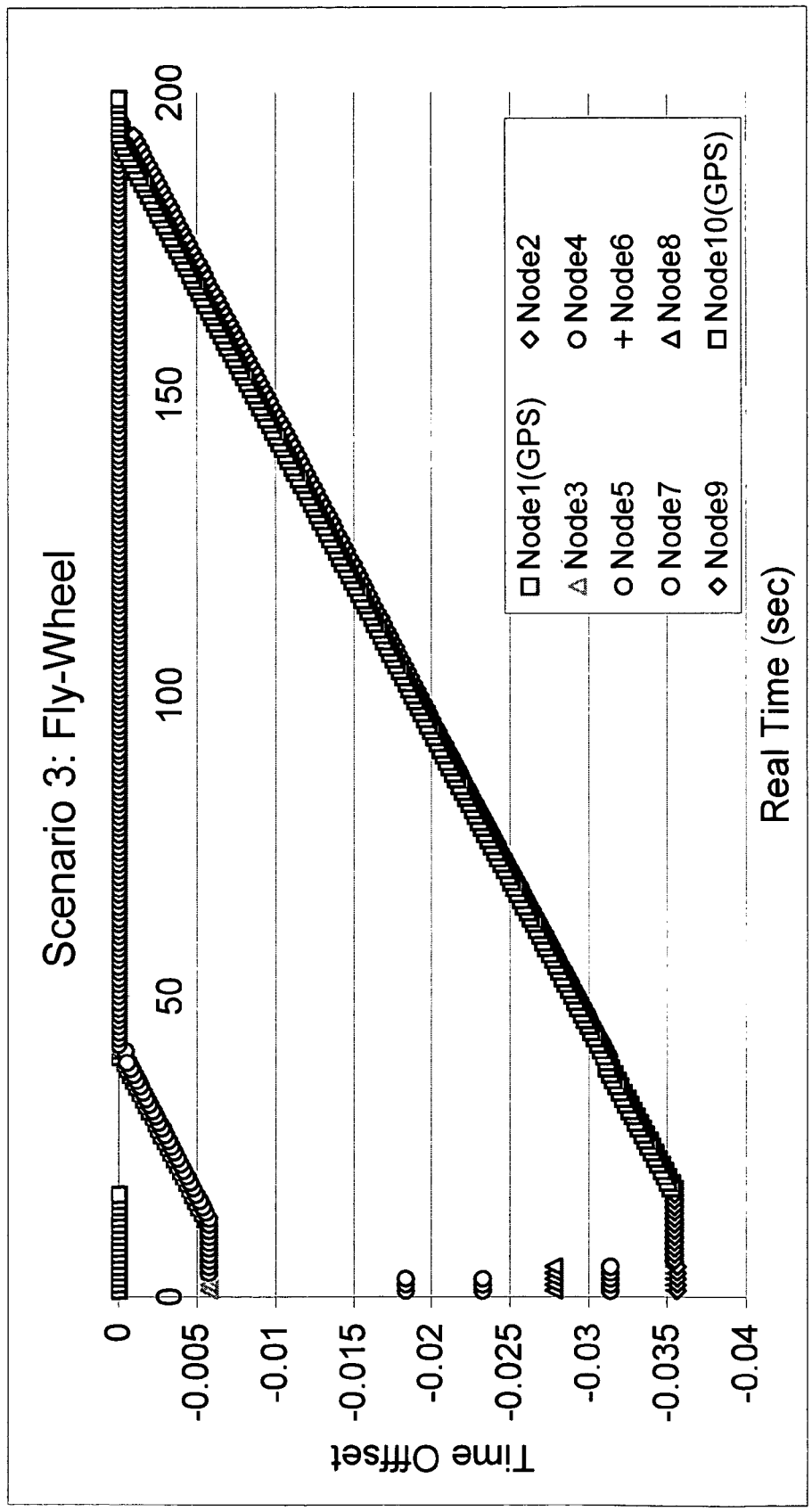
FIGS. 13A-13B are graphical plots illustrating the performance of the flywheel technique within the network of FIG. 12.

An exemplary configuration with fragmented networks is illustrated in FIG. 12. Specifically, the configuration includes nodes 1-10 arranged in fragmented networks. Nodes 2-5 reside within a first network and nodes 6-9 reside within a second network. Nodes 1 and 10 include GPS time and are accessible by the first and second networks, respectively. Nodes 5-6 lose and regain connectivity with their respective networks. The pulling of network time in the first and second networks by the flywheel technique is illustrated in FIG. 13A. The initial time offsets for the first and second networks between the network time and GPS time are approximately 0.005783 and 0.035455 seconds at real times of 11.360 seconds and 17.560 seconds, respectively. The time for the first and second networks to reach GPS time is approximately twenty-seven seconds and one-hundred seventy-five seconds, respectively.

Figure 13B:
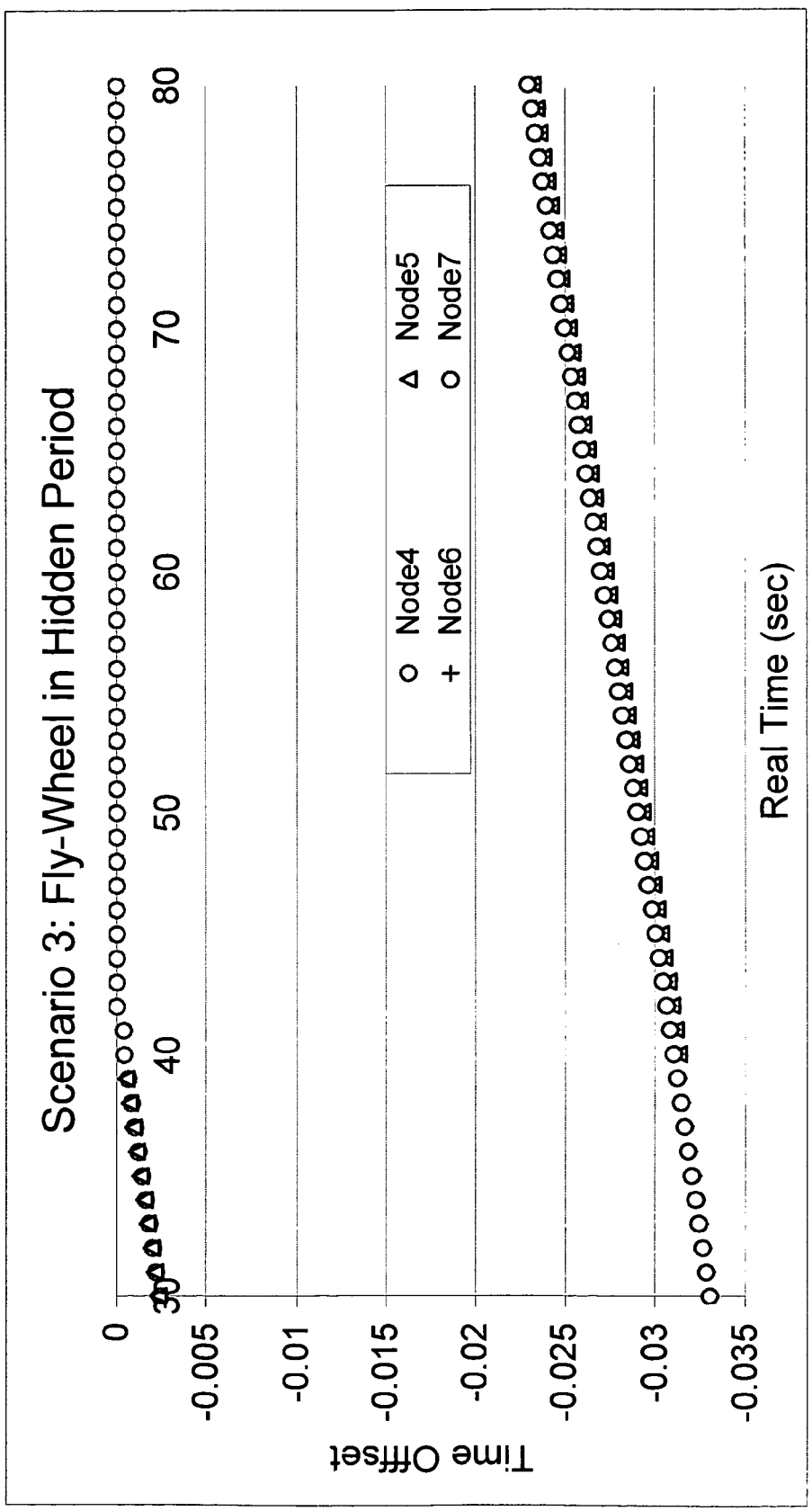

The time offset during the roaming period of nodes 5 and 6 (e.g., from thirty seconds to eighty seconds) is illustrated in FIG. 13B. Node 5 attains an Isolated status at approximately 40 seconds, synchronizes with node 6, and stays with the second network time even after node 5 connects back with the first network. This indicates that nodes 5 and 6 stay time-synchronized after these nodes roam together. This problem is overcome by the present invention synchronization as described below.

Figure 14A:
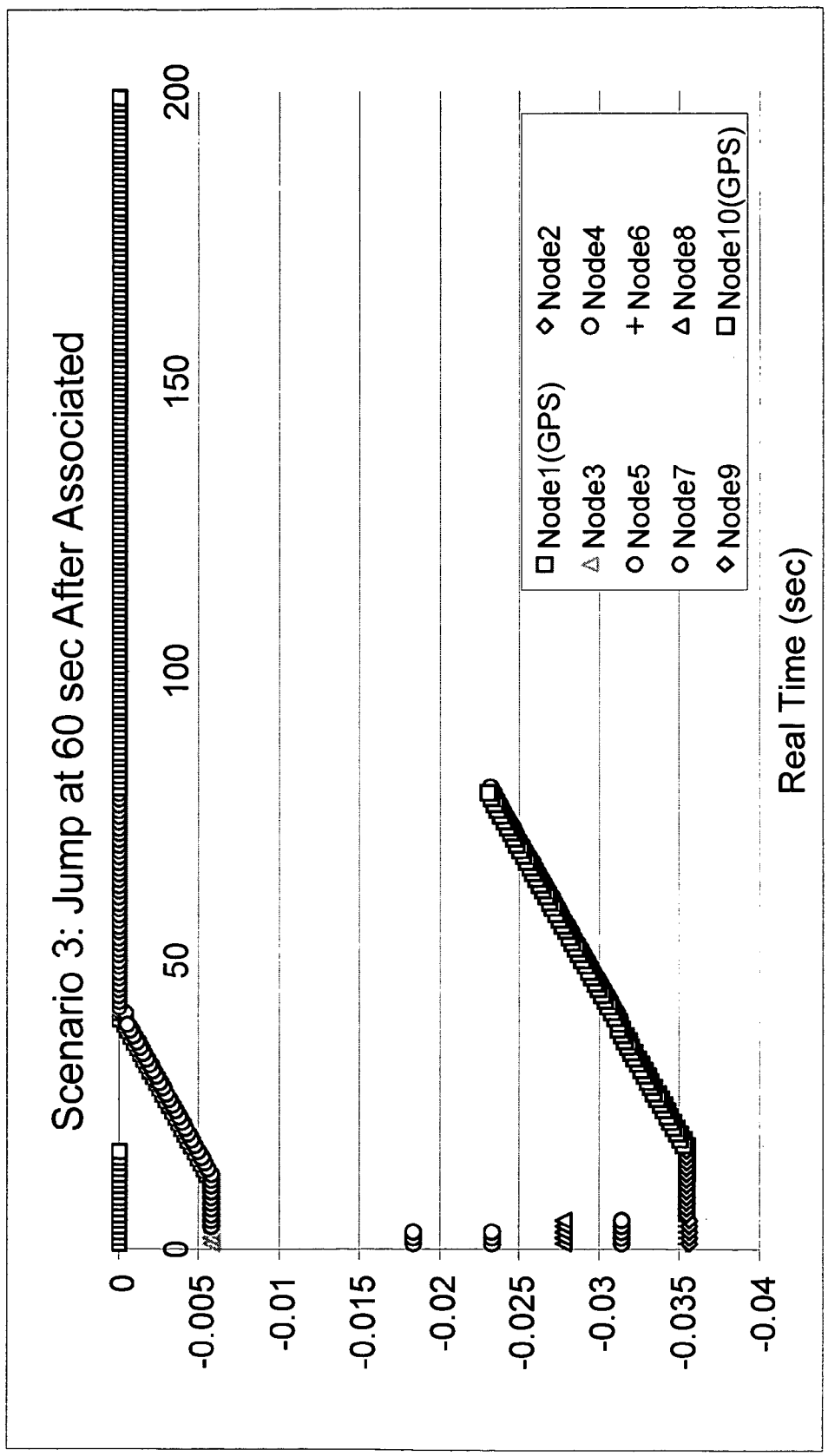
FIGS. 14A-14B are graphical plots illustrating the performance of the time-of-day synchronization according to the present invention within the network of FIG. 12.
Figure 14B:
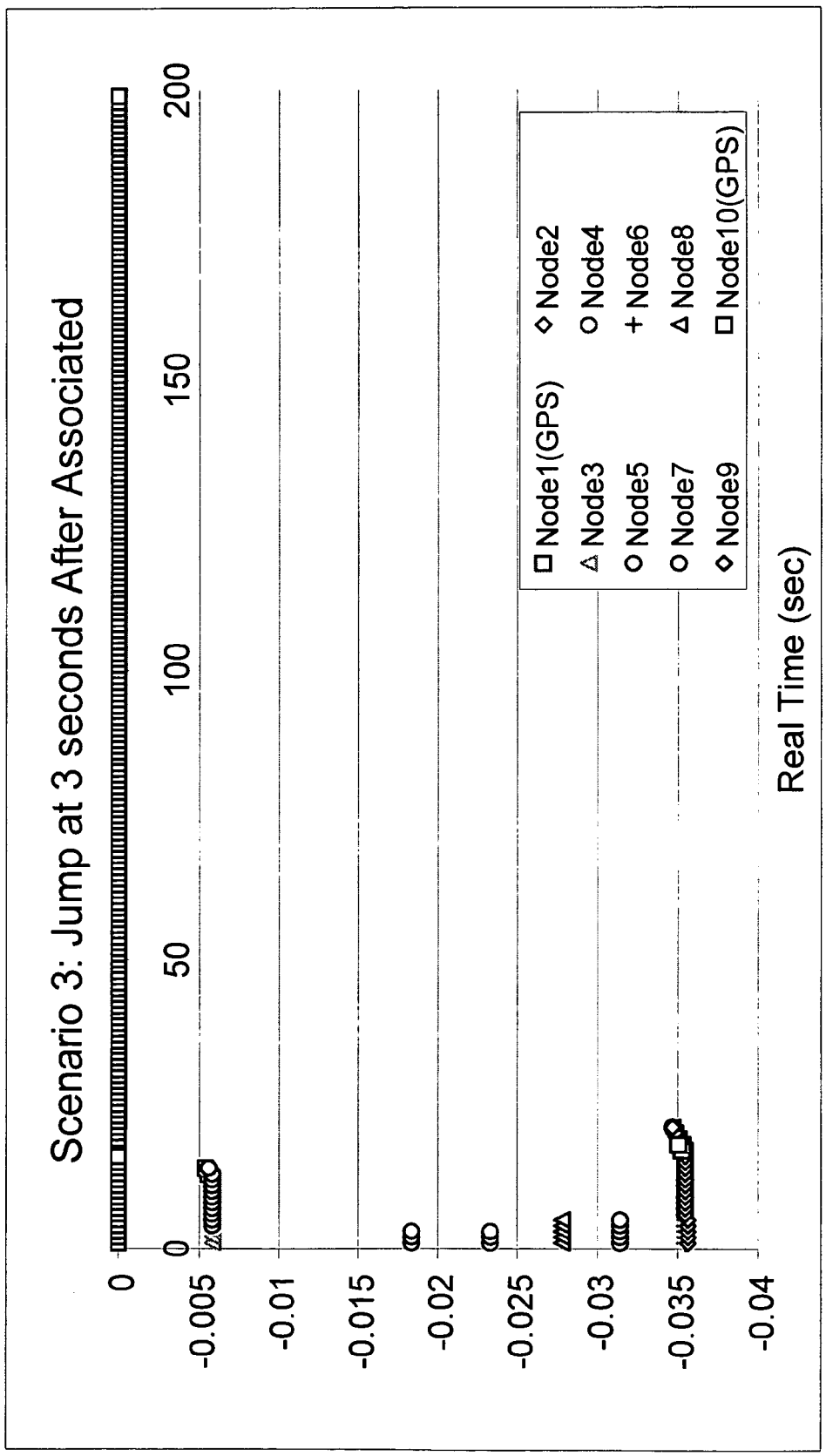

The improvement achieved with the present invention synchronization is illustrated in FIGS. 14A-14B. The network time transitions to GPS time at approximately sixty seconds (FIG. 14A) immediately after attaining Associated status. Since the first and second networks are based upon common GPS time after the transition, a node within the first network can hear nodes in the second network once the nodes are within range. When two unconnected islands come within proximity of one another, some of the member nodes begin to establish inter-island RF neighbor relationships. The island head nodes of each island periodically evaluate the network topology, and if a potential merge condition is found, the merge operation is negotiated by the island head nodes of each island. Unless time synchronization is reached by the unconnected islands, the merge operation cannot commence. The present invention resolves the network time merge problem without an expensive hardware/software implementation. The network time may alternatively transition to the GPS time immediately after a predetermined quantity of updates (e.g., three updates) when the island heads decide to transition based upon the network status. In this case, GPS time synchronization is accomplished for both networks at approximately twenty seconds (FIG. 14B).

It is to be understood that the present invention is not limited to the specific applications or networks described herein (e.g., tactical (ground-based) ad-hoc wireless networks, etc.), but may be applied to military or other ad-hoc wireless networks including or associated with airborne, ship-based and/or mixed ground-based/airborne/ship-based network configurations. Further, the present invention may be applied to commercial ad-hoc WLAN (wireless LAN) networks deploying or anticipating deploying plural hops (e.g., emerging 802.11 LANs, Bluetooth networks for industrial, medical, mining, fire-fighting and residential applications, etc.).

It will be appreciated that the embodiments described above and illustrated in the drawings represent only a few of the many ways of implementing a method and apparatus for time-of-day synchronization between network nodes.

The communication networks employing the present invention nodes may include any quantity of those nodes or tiers. The network nodes may be arranged in any fashion into any quantity of islands each having any quantity of nodes. The backbone network may include any quantity of head nodes, while communications within an island and between neighboring head nodes of the backbone network may utilize the same or different transmission frequencies. The formation of islands and designation of head nodes may be predetermined or accomplished dynamically via any conventional or other algorithm or technique. The nodes may communicate via any suitable communications medium (e.g., wired or wireless communication devices, etc.).

The present invention node may include any quantity of conventional or other transmitters, receivers and/or transceivers, where each transmitter or transceiver may transmit signals at any suitable frequency and in any suitable energy form (e.g., radio signals, microwave, optical signals, etc.), and any quantity of conventional or other receivers or transceivers, where each receiver or transceiver may receive signals at any suitable frequency and in any suitable energy form (e.g., radio signals, microwave, optical signals, etc.). The present invention node may include any quantity of independent transmitting and/or receiving devices, and utilize any quantity of frequency channels of any desired frequencies to send voice and/or data. The present invention node may employ any conventional access scheme or protocol to access and/or transmit information on the data and/or voice channels. The present invention node may include any quantity of any conventional or other audio components (e.g., speaker, microphone, etc.) and associated circuitry or devices (e.g., coder, A/D or D/A converter, etc.) to process voice signals. The present invention node may further include any quantity of any types of input or control devices (e.g., buttons, switches, etc.) to enter voice or data and control node operation. The node may be in the form of any type of radio unit or other communications device.

The modem may be implemented by any quantity of any conventional modem or other suitable device to transfer signals between the transceiver and processor. The GPS receiver may be implemented by any conventional or other receiver to receive GPS or other signals. The node antennas (e.g., transceiver, GPS, etc.) may be implemented by any conventional or other antennas capable of receiving and/or transmitting the corresponding signals (e.g., messages, GPS signals, etc.). The processor of the present invention node may be implemented by any conventional or other microprocessor, controller or circuitry to perform the functions described herein, while any quantity of processors or processing devices or circuitry may be employed within the present invention node. The time management unit, local clock generator and counter may be implemented by any quantity of any combination of hardware and/or software units or modules. These devices may be within or coupled to the node processor. The local clock generator may provide any suitable clock signal or reference. The processor functions (e.g., including the time management unit, counter and local clock generator) may be distributed in any fashion among any quantity of hardware and/or software modules, processors or other processing devices or circuits. The software for the processor of the present invention node may be implemented in any suitable computer language, and could be developed by one of ordinary skill in the computer and/or programming arts based on the functional description contained herein and the flow charts illustrated in the drawings. Further, any references herein of software performing various functions generally refer to processors performing those functions under software control. The software and/or algorithms described above and illustrated in the flow charts may be modified in any manner that accomplishes the functions described herein. The present invention node may alternatively include any components arranged in any fashion to facilitate time-of-day synchronization within the network in the manner described above.

The time-of-day synchronization messages (e.g., LNE, PROP, time-of-day information, confirmation, acknowledgement, etc.) may be of any size, may have any format, and may contain any desired information. The packets or messages may be transmitted at any suitable transmission rate or in response to any desired conditions. The various messages or packets may include any identifier to identify the type of message or packet. The packets may be broadcasted or transmitted any quantity of times.

The synchronization waveforms may be of any quantity and include any quantity of time slots. The time slots may be reserved or assigned in any manner, where the waveform may be arranged in any fashion. The waveform may include any quantity of epochs that are transmitted at any desired or suitable time intervals. Information may be transmitted in either or both of even and odd epochs.

The various timers, delays and/or counters (e.g., status timer, wait timer, transition timer, update timer, etc.) may be implemented by any combination of hardware and/or software modules or units and may be configured to maintain any desired or suitable time intervals and/or counts. The score value may be based on any suitable parameters (e.g., island size, update counts, etc.) combined in any fashion (e.g., weighted, summed, averaged, etc.), where the weights for the score value may be set to any desired values to provide a suitable sensitivity for transitioning to GPS time. The negotiation may be performed for any quantity of trials. The score threshold and predefined percentage may be set to any suitable values for a particular application. The update and transition counts may be based on any suitable parameters (e.g., maximum threshold time, updates prior to transition, time intervals, etc.) combined in any fashion (e.g., weighted, summed, averaged, etc.).

The network may include any quantity of any suitable node states for determining appropriate actions. By way of example, the present invention has been described with respect to a SUO type network with corresponding node states; however, any suitable type of network and corresponding states may be employed with the present invention. Further, the transition to GPS time may be accomplished from any desired state or at any suitable time that does not significantly affect current communications.

The various parameters (e.g., number of updates prior to a transition, $\Delta T_{max}$ or the update interval, $\Delta t_{max}$ or the maximum value of local clock time that a node local clock may be updated without losing time-of-day synchronization, maximum offset threshold, score threshold, percentage, number of trials, etc.) may be set to any suitable values for a particular application. The various flags (e.g., pulling, etc.) may be set and/or reset to any values to indicate corresponding conditions.

The various parameter names or labels are used herein by way of example and for descriptive purposes. The parameters may be associated with any desired labels or identifiers.

It is to be understood that the present invention is not limited to the applications or networks described herein, but may be utilized for various communication applications or networks, especially those including wireless ad-hoc radio networks.

From the foregoing description, it will be appreciated that the invention makes available a novel method and apparatus for time-of-day synchronization between network nodes, wherein a time-of-day synchronization (TOD) within wireless ad-hoc networks determines an appropriate time for network nodes to switch to a common GPS time without disruption of existing communication links.

Having described preferred embodiments of a new and improved method and apparatus for time-of-day synchronization between network nodes, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. In a communications network, a communication unit to transmit and receive information within said network comprising:
    a transmitter to transmit outgoing information to at least one other communication unit within said network;
    a receiver to receive incoming information from at least one other communication unit within said network;
    a clock generation unit to maintain a unit local time, wherein said unit local time initially varies from a common reference GPS time for said network maintained by another communication unit within said network; and
    a processor to control said transmission and reception of said outgoing and incoming information and synchronize time between said communication units of said network, wherein said processor includes:
        an update module to periodically update said unit local time by an update value and towards said common reference GPS time maintained by said other communication unit, wherein said periodic update is applied one or more times to pull said unit local time toward said common reference GPS time;
        and
        a transition module to transition said updated unit local time of said communication unit to said common reference GPS time of said other communication unit prior to application of all of said periodic updates for completion of said pulling by setting said updated unit local time, varying from said common reference GPS time of said other communication unit by at least one of said periodic updates, directly to said common reference GPS time at a determined transition time and in accordance with conditions indicating that said transition maintains existing network communications.

2. The communication unit of claim 1, wherein said common reference GPS time includes time received from a Global Positioning System.

3. The communication unit of claim 2, wherein said other communication unit includes:
    a receiver to receive said common reference GPS time from said Global Positioning System.

4. The communication unit of claim 1, wherein said update module includes:
    a clock drift module to determine a drift rate for said unit local time and to update said unit local time based on said determined drift rate.

5. The communication unit of claim 4, wherein said drift rate is determined based on current and previous unit local time updates, said common reference time and an update interval.

6. The communication unit of claim 1, wherein said communication network includes at least one group of communication units with each group designating a communication unit as a head unit with remaining group units designated as member units, wherein said processor further includes:
    a transition time module to selectively determines said transition time in response to said communication unit being designated as a head unit and including includeg:
        a score module to determine a score value based on network conditions;
        a compare module to determine appropriate conditions for transitioning to said common reference GPS time by comparing said score value to a threshold.

7. The communication unit of claim 6, wherein said score module determines said score value based on a quantity of communication units within a group and a quantity of updates for said unit local time to reach said common reference GPS time.

8. The communication unit of claim 6, wherein said transition time module further includes:
    a request module to facilitate transmission of a transition request to corresponding member communication units to transition to said common reference GPS time in response to said comparison;
    a reception module to receive acknowledgements to said transmitted request from said corresponding member communication units within said network;
    a transition synchronization module to determine said transition time in response to receiving acknowledgements from a quantity of member communication units in excess of a predefined quantity; and
    a confirmation module to facilitate transmission of confirmation messages to said corresponding member communication units in response to determining said transition time, wherein said confirmation messages include said determined transition time to enable said corresponding member communication units to transition to said common reference GPS time in accordance with said determined transition time.

9. The communication unit of claim 1, wherein said network includes an ad-hoc wireless network.

10. The communication unit of claim 1, wherein at least one of said incoming and outgoing information is in the form of radio frequency signals.

11. A method of synchronizing time for a communication units of a communications network, wherein said communication unit maintains a unit local time and said unit local time initially varies from a common reference GPS time for said network maintained by another communication unit within said network, said method comprising:
   (a) periodically updating said unit local time of said communication units by an update value and towards said common reference GPS time, wherein said periodic update is applied one or more times to pull said unit local time toward said common reference GPS time;
   (b) selectively determining a time to transition said updated local time of said communication units to said common reference GPS time for said network; and
   (c) transitioning said updated local time of said communication unit to said common reference GPS time of said other communication unit prior to application of all of said periodic updates for completion of said pulling by setting said updated unit local time of said communication units, varying from said common reference GPS time of said other communication unit by at least one of said periodic updates, directly to said common reference GPS time at said determined transition time and in accordance with conditions indicating that said transition maintains existing network communications.

12. The method of claim 11, wherein step (a) further includes:
   (a.1) receiving said common reference GPS time from a Global Positioning System.

13. The method of claim 11, wherein step (a) further includes:
   (a.1) determining a drift rate for said unit local time of said communication unit and updating that unit local time based on said determined drift rate.

14. The method of claim 13, wherein said drift rate is determined based on current and previous unit local time updates, said common reference GPS time and an update interval.

15. The method of claim 11, wherein said communications network includes at least one group of communication units with each group designating a communication unit as a head unit with remaining group units designated as member units, wherein step (b) further includes:
   (b.1) determining said transition time within a communication unit in response to that communication unit being designated as a head unit, and wherein step (b.1) further includes:
      (b.1.1) determining a score value based on network conditions; and
      (b.1.2) determining appropriate conditions for transitioning to said common reference GPS time by comparing said score value to a threshold.

16. The method of claim 15, wherein said score value is determined based on a quantity of communication units within a group and a quantity of updates for said unit local time to reach said common reference GPS time.

17. The method of claim 15, wherein step (b.1) further includes:

(b.1.3) transmitting a transition request to corresponding member communication units from a head unit to transition to said common reference GPS time in response to said comparison;
   (b.1.4) receiving acknowledgements to said transmitted request from said corresponding member communication units within said network;
   (b.1.5) determining said transition time in response to receiving acknowledgements from a quantity of member communication units in excess of a predefined quantity; and
   (b.1.6) transmitting confirmation messages to said corresponding member communication units in response to determining said transition time, wherein said confirmation messages include said determined transition time to enable said corresponding member communication units to transition to said common reference GPS time in accordance with said determined transition time.

18. The method of claim 11, wherein said network includes an ad-hoc wireless network.

19. The method unit of claim 11, wherein said communication units transfers signals in the form of radio frequency signals.

20. A communications network comprising:
   a plurality of communication units synchronizing time there between, wherein a communication unit comprising a processor configured to maintain a unit local time, initially varying from a common reference GPS time for said network maintained by another communication unit within said network, periodically updates said unit local time by an update value and towards said common reference GPS time, wherein said periodic update is applied one or more times to pull said unit local time toward said common reference GPS time, and wherein at least one communication unit determines a time to transition said updated unit local time of said communication unit to said common reference GPS time for said network and said communication unit transitions said updated unit local time to said common reference GPS time of said other communication unit prior to application of all of said periodic updates for completion of said pulling by setting said updated unit local time, varying from said common reference GPS time of said other communication unit by at least one of said periodic updates, directly to said common reference GPS time at said determined transition time and in accordance with conditions indicating that said transition maintains existing network communications.

21. The communications network of claim 20, wherein said common reference GPS time includes time received from a Global Positioning System.

22. The communications network of claim 20, wherein said communication unit determines a drift rate for said unit local time and updates that unit local time based on said determined drift rate.

23. The communications network of claim 22, wherein said drift rate is determined based on current and previous unit local time updates, said common reference GPS time and an update interval.

24. The communications network of claim 20, wherein said communications network includes at least one group of communication units with each group designating a communication unit as a head unit with remaining group units designated as member units, wherein said head units determine a score value based on network conditions and determine appropriate conditions for transitioning to said common reference GPS time by comparing said score value to a threshold.

25. The communications network of claim 24, wherein said score value is determined based on a quantity of communication units within a group and a quantity of updates for said unit local time to reach said common reference GPS time.

26. The communications network of claim 24, wherein said head units further transmit a transition request to corresponding member communication units to transition to said common reference GPS time in response to said comparison, receive acknowledgements to said transmitted request from said corresponding member communication units within said network, determine said transition time in response to receiving acknowledgements from a quantity of member communication units in excess of a predefined quantity, and transmit confirmation messages to said corresponding member communication units in response to determining said transition time, wherein said confirmation messages include said determined transition time to enable said corresponding member communication units to transition to said common reference GPS time in accordance with said determined transition time.

27. The communications network of claim 20, wherein said network includes an ad-hoc wireless network.

28. The communications network of claim 20, wherein said communication units transmit and receive signals in the form of radio frequency signals.

* * * * *

UNITED STATES PATENT AND TRADEMARK OFFICE
CERTIFICATE OF CORRECTION

| | | |
|---|---|---|
| PATENT NO. | : 7,710,944 B1 | Page 1 of 1 |
| APPLICATION NO. | : 11/521413 | |
| DATED | : May 4, 2010 | |
| INVENTOR(S) | : Chang-June Yoon | |

It is certified that error appears in the above-identified patent and that said Letters Patent is hereby corrected as shown below:

Col. 20, Claim 6, line 8, replace "and including includeg:" with -- and including: --.

Signed and Sealed this

Twenty-ninth Day of June, 2010

David J. Kappos
*Director of the United States Patent and Trademark Office*